(12) United States Patent
Rubsam et al.

(10) Patent No.: US 11,848,435 B2
(45) Date of Patent: *Dec. 19, 2023

(54) METAL-AIR CELLS WITH MINIMAL AIR ACCESS

(71) Applicant: Energizer Brands, LLC, St. Louis, MO (US)

(72) Inventors: Tony Rubsam, Madison, WI (US); John Kania, Middleton, WI (US); Danielle Proffit, St. Louis, MO (US); Katharine Kerr, Middleton, WI (US); Marc Syvertsen, St. Louis, MO (US); Ian Pozdol, Middleton, WI (US)

(73) Assignee: Energizer Brands, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/093,027

(22) Filed: Jan. 4, 2023

(65) Prior Publication Data
US 2023/0155212 A1 May 18, 2023

Related U.S. Application Data

(63) Continuation of application No. 17/365,328, filed on Jul. 1, 2021, now Pat. No. 11,575,168.

(51) Int. Cl.
| | | |
|---|---|---|
| *H01M 12/06* | (2006.01) | |
| *H01M 50/138* | (2021.01) | |
| *H01M 6/04* | (2006.01) | |

(52) U.S. Cl.
CPC ........... *H01M 12/06* (2013.01); *H01M 6/045* (2013.01); *H01M 50/1385* (2021.01); *H01M 2300/0014* (2013.01)

(58) Field of Classification Search
CPC .. H01M 12/06; H01M 50/1385; H01M 6/045; H01M 2300/0014
See application file for complete search history.

(56) References Cited

U.S. PATENT DOCUMENTS

| | | |
|---|---|---|
| 5,049,457 A | 9/1991 | Niksa et al. |
| 5,595,949 A | 1/1997 | Goldstein et al. |
| 6,830,847 B2 | 12/2004 | Ramaswami et al. |
| 7,001,689 B2 | 2/2006 | Buckle |
| 7,288,920 B2 | 10/2007 | Bushong et al. |
| 11,031,644 B2 | 6/2021 | Pozdol et al. |
| 2007/0054168 A1 | 3/2007 | Chang et al. |
| 2007/0122709 A1 | 5/2007 | Pratt et al. |

(Continued)

FOREIGN PATENT DOCUMENTS

| | | |
|---|---|---|
| EP | 3 207 586 A1 | 8/2017 |
| WO | WO-2016/183373 A1 | 11/2016 |

OTHER PUBLICATIONS

International Search Report and Written Opinion in International Application PCT/US2019/068473 dated Mar. 5, 2020.

(Continued)

*Primary Examiner* — James Lee
(74) *Attorney, Agent, or Firm* — Foley & Lardner LLP

(57) ABSTRACT

A battery includes an air cathode, an anode, an aqueous electrolyte, and a housing, wherein the housing includes one or more air access ports defining a total vent area; the battery exhibits a cell limiting current at 1.15V; a ratio of cell limiting current at 1.15 V to total vent area is greater than about 100 mA/mm²; and the aqueous electrolyte includes an amphoteric fluorosurfactant.

18 Claims, 12 Drawing Sheets

(56) References Cited

U.S. PATENT DOCUMENTS

| | | |
|---|---|---|
| 2017/0237134 A1 | 8/2017 | Guha et al. |
| 2017/0244106 A1 | 8/2017 | Mortensen |
| 2017/0294650 A1 | 10/2017 | Marple |
| 2020/0212527 A1 | 7/2020 | Pozdol et al. |
| 2021/0280931 A1 | 9/2021 | Pozdol et al. |

OTHER PUBLICATIONS

International Search Report and Written Opinion issued for PCT/US2022/035329 dated Jul. 26, 2022, 8 pages.

US 11,848,435 B2

METAL-AIR CELLS WITH MINIMAL AIR ACCESS

CROSS-REFERENCE TO RELATED APPLICATION

This application is a continuation of U.S. patent application Ser. No. 17/365,328, filed on Jul. 1, 2021, the entire contents of which are incorporated herein by reference for any and all purposes.

FIELD

The present technology is generally related to the field of metal-air batteries and the uses thereof.

SUMMARY

In one aspect, a battery is provided that includes an air cathode, an anode, an aqueous electrolyte, and a housing, wherein: the housing comprises one or more air access ports defining a total vent area; the battery exhibit a cell limiting current at 1.15V; a ratio of cell limiting current at 1.15 V to total vent area is greater than about 100 mA/mm$^2$; and the aqueous electrolyte comprises an amphoteric fluorosurfactant. In some embodiments, the ratio is greater than about 150 mA/mm$^2$. In some embodiments, the ratio is greater than 250 mA/mm$^2$. In some embodiments, the ratio is from about 70 mA/mm$^2$ to about 1000 mA/mm$^2$. In some embodiments, the battery has a nominal diameter of about 8 mm and a nominal height of about 5.4 mm. In some embodiments, the battery has a nominal diameter of about 8 mm and a nominal height of about 3.6 mm. In some embodiments, the battery has a nominal external volume from about 180 mm$^3$ to about 270 mm$^3$. In some embodiments, the battery has a nominal electrode interfacial area is about 35 mm$^2$. In some embodiments, the battery has a nominal electrode interfacial area from about 25 to 50 mm$^2$. In some embodiments, the total vent area is from about 0.030 mm$^2$ to about 0.115 mm$^2$. In some embodiments, the cell limiting current at 1.15 V is about 4 mA to about 15 mA.

In another aspect, a battery is provided comprising an air cathode, an anode, an aqueous electrolyte, and a housing, wherein: the housing comprises one or more air access ports defining a total vent area; the battery has an interfacial surface area between the anode and cathode; a ratio of vent area to interfacial area is about 3×10$^{-3}$ or smaller (provided that when the battery is a size 13 battery then the ratio is about 2.4×10$^{-3}$ or smaller); and the aqueous electrolyte comprises an amphoteric fluorosurfactant. In some embodiments, the ratio is from about 1.0×10$^{-3}$ to about 3.0×10$^{-3}$. In some embodiments, the ratio is from about 1.0×10$^{-3}$ to about 2.4×10$^{-3}$. In some embodiments, the ratio is from about 1.4×10$^{-3}$ to about 3.0×10$^{-3}$. In some embodiments, the battery has a nominal diameter of about 8 mm and a nominal height of about 5.4 mm. In some embodiments, the battery has a nominal diameter of about 8 mm and a nominal height of about 3.6 mm. In some embodiments, the battery has a nominal electrode interfacial area is from about 25 to 50 mm$^2$. In some embodiments, a total vent area is from about 0.030 mm$^2$ to about 0.115 mm$^2$.

In a further aspect, a battery is provided comprising an air cathode, an anode, an aqueous electrolyte, and a housing, wherein: the housing comprises one or more air access ports defining a total vent area; the battery exhibits a cell limiting current at 0.9V and a cell limiting current at 1.15V; the ratio of cell limiting current at 1.15 V to cell limiting current at 0.9V is greater than about 0.6; and the aqueous electrolyte comprises an amphoteric fluorosurfactant. In some embodiments, the ratio is greater than about 0.7. In some embodiments, the ratio is greater than 0.75. In some embodiments, the ratio is from about 0.6 to 0.9. In some embodiments, the battery has a nominal diameter of about 8 mm and a nominal height of about 5.4 mm. In some embodiments, the battery has a nominal diameter of about 8 mm and a nominal height of about 3.6 mm. In some embodiments, the battery has a nominal external volume from about 180 mm$^3$ to about 270 mm$^3$. In some embodiments, the nominal electrode interfacial area is about 35 mm$^2$. In some embodiments, the total vent area is from about 0.030 mm$^2$ to about 0.13 mm$^2$. In some embodiments, the cell limiting current at 1.15 V is about 4 mA to about 15 mA.

In yet another aspect, a battery is provided comprising an air cathode, an anode, an aqueous electrolyte, and a housing, wherein: the housing comprises one or more air access ports defining a total vent area; the battery exhibits a cell limiting current at 0.9V; the battery, when discharged at a current equal to half of the limiting current, maintains voltage of 1.17V or higher through 50% of its discharge to 0.9V; and the aqueous electrolyte comprises an amphoteric fluorosurfactant.

In yet a further aspect, a battery is provided, the battery comprising an air cathode, an anode, an aqueous electrolyte, and a housing, wherein: the housing comprises one or more air access ports defining a total vent area; the battery exhibits a cell limiting current at 0.9V; the battery, when discharged at a current equal to one-third of the limiting current, maintains voltage of 1.20V or higher through 50% of its discharge to 0.9V; and the aqueous electrolyte comprises an amphoteric fluorosurfactant.

DETAILED DESCRIPTION

Figure 1:
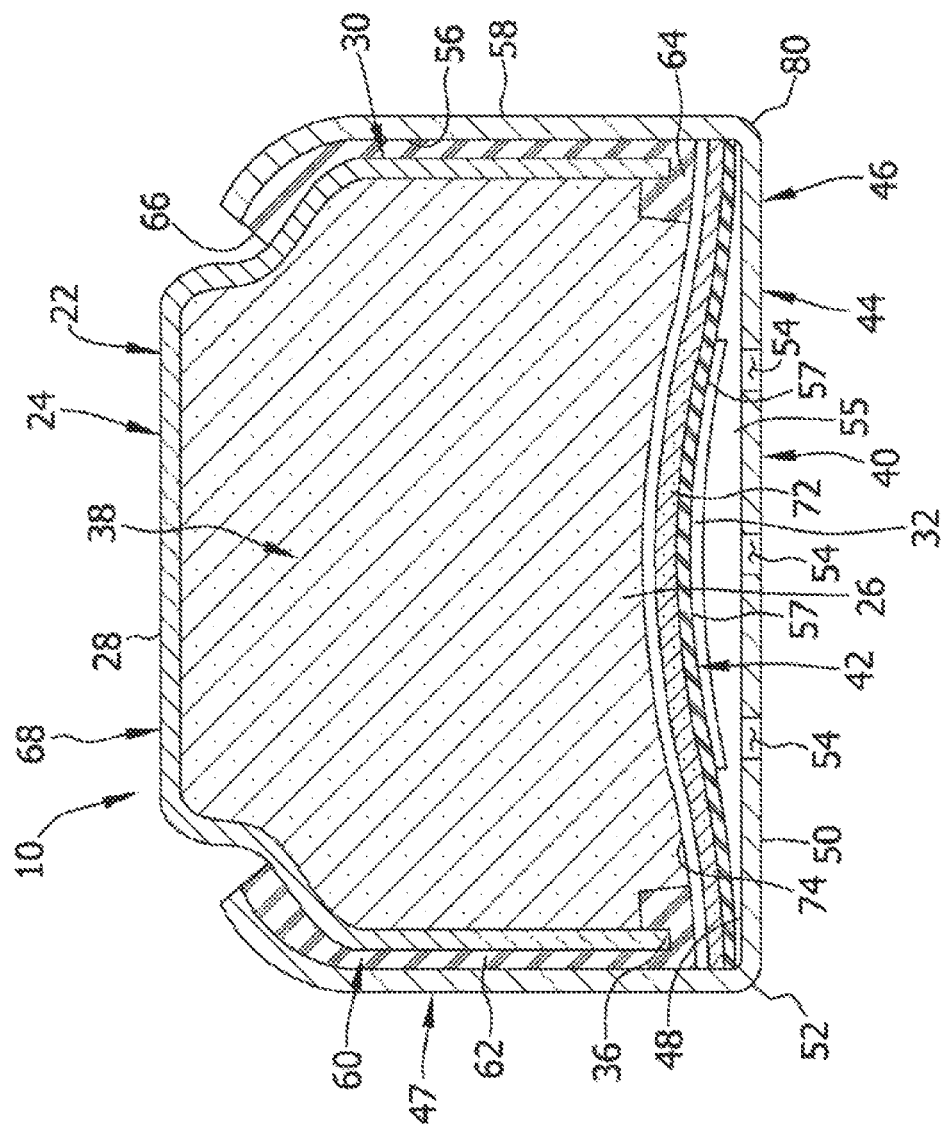
FIG. 1 is a cross-sectional, schematic view depicting an illustrative electrochemical cell.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term—for example, "about 10 wt. %" would be understood to mean "9 wt. % to 11 wt. %." It is to be understood that when "about" precedes a term, the term is to be construed as disclosing "about" the term as well as the term without modification by "about"—for example, "about 10 wt. %" discloses "9 wt. % to 11 wt. %" as well as disclosing "10 wt. %."

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

In general, "substituted" refers to an alkyl, alkenyl, alkynyl, aryl, or ether group, as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

As used herein, "alkyl" groups include straight chain and branched alkyl groups having from 1 to about 20 carbon atoms, and typically from 1 to 12 carbons or, in some embodiments, from 1 to 8 carbon atoms. Alkyl groups may be substituted or unsubstituted. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, neopentyl, and isopentyl groups. Representative substituted alkyl groups may be substituted one or more times with, for example, amino, thio, hydroxy, cyano, alkoxy, and/or halo groups such as F, Cl, Br, and I groups. As used herein the term haloalkyl is an alkyl group having one or more halo groups. In some embodiments, haloalkyl refers to a per-haloalkyl group.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 6, or 7. Cycloalkyl groups may be substituted or unsubstituted. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined above. Representative substituted cycloalkyl groups may be mono-substituted or substituted more than once, such as, but not limited to: 2,2-; 2,3-; 2,4-; 2,5-; or 2,6-disubstituted cyclohexyl groups or mono-, di-, or tri-substituted norbornyl or cycloheptyl groups, which may be substituted with, for example, alkyl, alkoxy, amino, thio, hydroxy, cyano, and/or halo groups.

Alkenyl groups are straight chain, branched or cyclic alkyl groups having 2 to about 20 carbon atoms, and further including at least one double bond. In some embodiments alkenyl groups have from 1 to 12 carbons, or, typically, from 1 to 8 carbon atoms. Alkenyl groups may be substituted or unsubstituted. Alkenyl groups include, for instance, vinyl, propenyl, 2-butenyl, 3-butenyl, isobutenyl, cyclohexenyl, cyclopentenyl, cyclohexadienyl, butadienyl, pentadienyl, and hexadienyl groups among others. Alkenyl groups may be substituted similarly to alkyl groups. Divalent alkenyl groups, i.e., alkenyl groups with two points of attachment, include, but are not limited to, CH—CH=CH$_2$, C=CH$_2$, or C=CHCH$_3$.

The term "alkoxy group" refers to a hydroxy group (OH) in which the H has been replaced by an alkyl group comprising from 1 to 12 carbon atoms as defined herein. In some embodiments, the alkoxy group comprises 1 to 7 or 1 to 4 carbon atoms. The alkoxy group may be, e.g., a methoxy group, an ethoxy group, a propoxy group, a isopropoxy group, a n-butoxy group, a sec-butoxy group, tert-butoxy group, pentoxy group, isopentoxy group, 3-methylbutoxy group, 2,2-dimethylpropoxy group, n-hexoxy group, 2-methylpentoxy group, 2,2-dimethylbutoxy group, 2,3-dimethylbutoxy group, n-heptoxy group, 2-methylhexoxy group, 2,2-dimethylpentoxy group, 2,3-dimethylpentoxy group, cyclopropoxy group, cyclobutoxy group, cyclopentyloxy group, cyclohexyloxy group, cycloheptyloxy group, 1-methylcyclopropyl oxy group and others. In some embodiments, the alkoxy group comprises O—C$_1$-C$_6$-alkyl groups. In other embodiments, the alkoxy group comprises O—C$_1$-C$_4$-alkyl groups.

The term "amine" (or "amino") as used herein refers to —NR$^{100}$R$^{101}$ groups, wherein R$^{100}$ and R$^{101}$ are independently hydrogen, or a substituted or unsubstituted alkyl, alkenyl, alkynyl, cycloalkyl, aryl, aralkyl, heterocyclylalkyl or heterocyclyl group as defined herein. In some embodiments, the amine is alkylamino, dialkylamino, arylamino, or alkylarylamino. In other embodiments, the amine is NH$_2$, methylamino, dimethylamino, ethylamino, diethylamino, propylamino, isopropylamino, phenylamino, or benzylamino.

The term "halogen" or "halo" as used herein refers to bromine, chlorine, fluorine, or iodine. In some embodiments, the halogen is fluorine. In other embodiments, the halogen is chlorine or bromine.

The term "hydroxyl" as used herein can refer to —OH or its ionized form, —O—.

The term "nitrile" or "cyano" as used herein refers to the —CN group.

The term "thio" as used herein refers to a —S— group or an ether wherein the oxygen is replaced with sulfur.

As used herein, the term "amphoteric fluorosurfactants" refers to fluorosurfactants including at least one cationic group and/or group able to be protonated into a cationic group, such as a primary, secondary, tertiary, and/or quaternary amine group; and at least one anionic group and/or group able to be deprotonated into an anionic group, such as a carboxy group, a sulfonic acid group, phosphate group, a phosphonate group, are a salt of any one or more thereof.

As used herein, the term "betaine functionality" refers to a neutral compound with a positively charged cationic functional group and a negatively charged functional group. In some embodiments, the cationic functional group may be a quaternary ammonium or phosphonium cation, which bears no hydrogen atom. In some embodiments, the negatively charged functional group may be a carboxylate group.

As used herein, the term "short-chain perfluoro substituent" refers to a C$_1$-C$_7$ perfluoro substituent.

As used herein, the term "zinc anode" refers to an anode that includes zinc as an anode active material.

As used herein, the term "ppm" means parts per million by weight, unless explicitly expressed otherwise.

As used herein, the term "ppm" as regards amphoteric fluorosurfactants means parts per million by weight of active component, unless explicitly expressed otherwise.

In the design of metal-air cells, it is useful to define properties of the cell in terms of limiting current. A cell limiting current test is performed by holding the cell at a specific voltage for a specific amount of time, and measuring the resulting current provided by the cell at a set time endpoint. As a cell is initially held to a voltage (using an instrument that adjusts the current drain from the cell to reach the set voltage), the current will initially be high, and decline asymptotically to a relatively constant level. Typically, the set time is chosen at a point where the current is in this relatively constant range.

As used herein, "cell limiting current at 0.9V" means the current provided by a metal-air electrochemical cell at 0.9V, at the end of 60 seconds during which the cell has been held at a voltage of 0.9V. Prior to this test, the cell should not be under any load for at least 60 seconds.

As used herein, "cell limiting current at 1.15V" means the current provided by a metal-air electrochemical cell at 1.15V, at the end of 60 seconds during which the cell has been held at a voltage of 1.15V. Prior to this test, the cell should not be under any load for at least 60 seconds.

It has now been observed that oxygen utilization in a metal-air electrochemical cell may be unexpectedly improved through the combination of an electrolyte having a fluorinated amphoteric surfactant and lithium hydroxide in a cell housing having limited air access. The electrolyte formulation has been found to increase closed cell voltage and cathode half-cell voltage, while allowing for reduction in oxygen access required by the cell for a given current draw and/or maintaining a desirable closed circuit voltage. This greater efficiency in oxygen utilization and higher cell voltage enables the use of a smaller vent area to the exterior of the cell, reducing exposure to the detrimental effects of moisture (H$_2$O vapor) and carbon dioxide (CO$_2$). This greater efficiency in oxygen utilization and higher cell voltage also enables the use of less porous diffusion layers between the air access ports and the active cathode material, also reducing exposure to the detrimental effects of moisture and CO$_2$. These changes reduce the access to oxygen and improve performance at low and high humidity conditions as well as environments with elevated CO$_2$ concentrations.

Described herein is the combination of a high voltage anode formulation composed of an amphoteric fluorosurfactant and a cell designed such that the cell limiting current is reduced to the lowest possible level while still meeting the drain rate use requirements. The present technology provides a battery that includes an air cathode, an anode, an aqueous electrolyte that includes an amphoteric surfactant, and a housing that includes one or more air access ports defining a total area of void space ("vent area"). The ratio of a number of the variables to the vent area has been tested for a variety of cells.

In accordance with the surprising observations described herein, when an amphoteric fluorosurfactant is used in the electrolyte of the batteries of the present technology, the minimum required total vent area defined by the air access ports was found to be surprisingly low. By way of example, in the improved batteries of the present technology the total vent area of a size 312 cell may be 0.0660 mm$^2$, a 24% reduction from the standard/convention dimension of 0.0869 mm$^2$. In some embodiments, the size 312 vent area may be 0.033 mm$^2$. In some embodiments, the size 312 vent area may be from about 0.01 mm$^2$ to about 0.1 mm$^2$, or from about 0.03 mm$^2$ to about 0.07 mm$^2$. As another example, in the improved batteries of the present technology the total vent area of size 13 cell may be 0.0998 mm$^2$, a 30% reduction from the reduced from the standard/convention dimension of 0.1295 mm². In some embodiments, the size 13 vent area may be 0.1295 mm², or about 0.0499 mm². In some embodiments, the size 13 vent area may be from about 0.04 mm² to about 0.15 mm², or about 0.05 mm² to about 0.13 mm², or from about 0.09 mm² to about 0.13 mm². Without being bound by theory, it is proposed that the reduced vent area is made possible by the high voltage and more efficient electrolyte formulation (i.e., including an amphoteric fluorosurfactant and optionally LiOH·xH$_2$O) where the amphoteric fluorosurfactant may help reduce voltage suppression while maintaining gassing reliability and the combination of the components in the anode may provide for a significantly enhanced improvement in cell voltage and cell performance.

As a point of reference, a size 13 cell has outer dimensions of about 8.0 mm in diameter and about 5.4 mm in height, while a size 312 cell has outer dimensions of about 8.0 mm in diameter and about 3.6 mm in height. These are nominal dimensions and typical actual dimensions are 0 to 0.2 mm smaller than the nominals. The external volume is calculated here, and shown in Table 1 below, as if the cell were a cylinder at nominal dimensions, although the actual cell volumes may be slightly less both due to deviations in actual dimensions for each cell produced, and to one end of the cell incorporating a notch to prevent backwards insertion of such small devices. Electrode interfacial areas are calculated based on the diameter of the hole through the insulator (6.7 mm) on the inside of the cell.

elements. Ultimately, these design elements will affect the ability of the cell to access and utilize oxygen efficiently. Thus, the ratio of limiting current at 1.15 V to vent area will provide a measure of those abilities no matter the size of the cell. According to various embodiments, a cell may be provided in which a ratio of limiting current at 1.15 V to vent area is greater than 100 mA/mm². In some embodiments, this ratio may be greater than about 150 mA/mm², greater than 200 mA/mm², greater than 210 mA/mm², or greater than 250 mA/mm². In other embodiments, this ratio may be from about 10 mA/mm² to about 1000 mA/mm², from about 80 mA/mm² to about 500 mA/mm², from about 70 mA/mm² to about 300 mA/mm², from about 70 mA/mm² to about 220 mA/mm², or from about 100 mA/mm² to about 200 mA/mm².

Another measure of electrode capacity is found in the relationship between the vent area and the interfacial area, the area between the anode and cathode. The ratio of these values provides a measure of the relative area of the air access ports that allow air access to the cathode, as compared to the amount of electrode interface that couples the activity of the cathode to the electrolyte and anode electrochemical reaction. Without being bound by theory, the ratio of vent area to interfacial area indicates the relative kinetic properties of the transport of oxygen into the cell vs. the activation and transport of the oxygen and incorporation into the electrolyte for use with the anode, as dictated by the properties of the triple phase boundary at the cathode-anode

TABLE 1

Illustrative Cell dimensions for new invention

| Cell Size | Nominal Diameter (mm) | Nominal Height (mm) | Nominal external volume (mm³) | Insulator through hole inside diameter (mm) | Nominal electrode interfacial area (mm²) |
|---|---|---|---|---|---|
| 312 | 8.0 | 3.6 | 180 | 6.706 | 35.32 |
| 13 | 8.0 | 5.4 | 270 | 6.725 | 35.52 |

| Size | Vent area (mm²) | Vent area/ interfacial area | Typical cell limiting current at 0.9 V for invention (mA) | Typical cell limiting current at 1.15 V for invention (mA) [called current density for internal testing] | Cell limiting current at 1.15 V/cell limiting current at 0.9 V |
|---|---|---|---|---|---|
| 312 | 0.0660 | 1.87 × 10⁻³ | 12 | 10 | 0.833 |
| 13 | 0.0998 | 2.81 × 10⁻³ | 13 | 10 | 0.769 |

As noted above, the dimensions provided are approximate, and they may range from their nominal values to their actual values. Accordingly, we note that the external volumes that may be calculated may range for a cell from about 150 mm³ to about 300 mm³. Further, the interfacial areas of some cells may vary for a number of reasons including variation in exact thickness of the cell housing, the actual diameter of the cell insulators, and the like. Thus, the interfacial area may range from about 25 mm² to about 50 mm². More broadly, interfacial area of similar format cells range from 15 to 75 mm².

The cell limiting current of the cells at 1.15 V is dependent upon the cell design. The design factors that affect this element include but are not limited to the vent area of the cell, the diffusion layer porosity between the air access ports and the cathode active layer, and the electrolyte and anode interface. The interfacial area is a rough estimate of the amount of triple phase boundary required, assuming volume, tortuosity and wettability are constant. If the vent area required is small, less oxygen enters the cell and less is available for conversion to hydroxyl groups and oxygen ions in the electrolyte. The assumption is that the overpotential for the reaction on the anode must therefore be smaller as less excess reactant is required in the electrolyte. Alternatively, there could be a higher activity at the cathode sites to convert into reactants in the electrolyte. The ratio of vent area to interfacial area may be about 1.0×10⁻⁴ or greater, or about 1.0×10⁻⁴ or greater. The ratio of vent area to interfacial area may be from about 1.0×10⁻⁴ to about 3.0×10⁻³. The ratio of vent area to interfacial area may be from about 1.0×10⁻³ to about 3.0×10⁻³. In various embodiments, the ratio of vent area to interfacial area may be from about $1.0\times10^{-3}$ to about $3.0\times10^{-3}$, from about $1.0\times10^{-3}$ to about $2.4\times10^{-3}$, or from about $1.4\times10^{-3}$ to about $3.0\times10^{-3}$.

Further measures of cell activity and stability may be found by measuring the ratio of cell limiting current at 1.15 V to cell limiting current at 0.9 V. The cell limiting current at 1.15 V represents the maximum current that can be generated by the cell at 1.15 V, which is a reasonable voltage in the operating window of a hearing aid device. The cell limiting current at 0.9 V represents the maximum current at the lowest reasonable operating voltage this battery should see. The 0.9 V cell limiting voltage represents kinetic phenomenon far from equilibrium. By studying the ratio of these two values, it is possible observe that different rate limiting steps and mechanisms are at play at these two potentials as dictated by the battery design. According to various embodiments, a cell may be provided in which a ratio of cell limiting current at 1.15 V to cell limiting current at 0.9 V is greater about 0.6. In some embodiments, this ratio may be greater than about 0.7 or greater than 0.75. In other embodiments, this ratio may be from about 0.6 to 0.9.

The cell limiting current at 0.9V also indicates the current the cell is able to provide when the current becomes limited by the availability of oxygen to the cathode. This current is "limiting" in two senses: one, because the current changes little with time after an initial approximately 30 seconds when the cell is held at 0.9V (the electrochemical definition), but also, second, because a further reduction in voltage below 0.9V results in little change in current due the position of this voltage on the cell's polarization curve. In the design of the cell for a specific application, choices are made in the size and number of air access ports, and the porosity of other layers of material that oxygen must diffuse through to reach the reaction site. The cell must have adequate limiting current to support the desired discharge current range of the cell when in use. However, if the limiting current at 0.9V is any higher than needed, the cell is adversely affected. This adverse effect is because moisture ($H_2O$ vapor) and carbon dioxide ($CO_2$) have very similar diffusion characteristics through air access ports and membrane layers. Thus, higher limiting current at 0.9V serves as a proxy for more diffusion of water vapor and carbon dioxide. Diffusion of water vapor in or out of the cell will occur whenever the cell is not in an environment with equilibrium humidity, and will change the makeup of the cell and adversely affect its performance. Likewise, carbon dioxide is known to dissolve in the electrolyte, reduce ionic conductivity, and reduce the cell performance. Thus, it is desirable for the cell to have the lowest limiting current at 0.9V possible while supporting the desired discharge current rates.

The limiting current measured at 1.15V, as referred to earlier, is an approximation of the highest usable constant current load for the cell, because this is measured at a working voltage for the cell. It is noteworthy that this measurement is only "limiting" in time, but it is sensitive to small changes in voltage, unlike the limiting current measured at 0.9V, because it is on a rather flat part of the polarization curve where small changes in voltage result in large changes in current. Therefore, a cell with a higher ratio of limiting current at 1.15V to limiting current at 0.9V is advantageous, because it can be designed to provide the same current under device working conditions as an ordinary cell, while having a lower limiting current at 0.9V, and, therefore, lower moisture and carbon dioxide transport.

It has now been found that with the cells described herein, a continuous current may be provided while the cell has a lower limiting current at 0.9V, than previously required. A limiting current at 0.9V of only twice the continuous current is required. Thus, for 6 mA current, only 12 mA limiting current at 0.9V is required, and this cell provides superior results because of the reduction in moisture and carbon dioxide transport.

The above rule could be modified depending on the voltage requirement and current pulse requirements of the application, but the general principle and differences in the designs still applies. For an ordinary cell, if a limiting current at 0.9V that is twice the maximum continuous current required is adequate, then with the invented cell, a limiting current at 0.9V of only 1.33 times the continuous current would be equally adequate. In this case, if the continuous current demanded is 9 mA, an ordinary cell would need to be designed with limiting current at 0.9V of 18 mA, but the invented cell could be designed with limiting current at 0.9V of 12 mA.

In any embodiment herein, the amphoteric fluorosurfactant may include a short-chain perfluoro substituent, which cannot break down to perfluorooctanoic acid. In any embodiment herein, the amphoteric fluorosurfactant may include a betaine functionality. For example, the amphoteric fluorosurfactant may be represented as a compound of Formula (I):

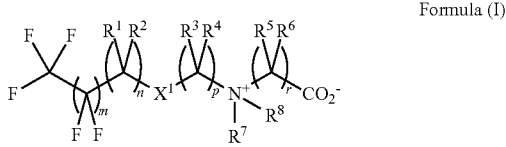

Formula (I)

wherein $R^1$, $R^2$, $R^3$, $R^4$, $R^5$, $R^6$, $R^7$, and $R^8$ are each independently a hydrogen, alkyl, alkenyl, or cycloalkyl group; $X^1$ is —C(O)—, —$SO_2$—, —C(O)$NR^a$—, —$SO_2NR^a$—, —$CO_2$—, or —$SO_2O$—; $R^a$ is H or an alkyl group; m and p are each independently 0, 1, 2, 3, 4, 5, or 6; and n and r are each independently 1, 2, 3, 4, or 5. In some embodiments, $R^1$-$R^6$ are H, $R^7$ and $R^8$ are $C_1$-$C_4$ alkyl, n and p are 2, m is from 4, 5, or 6, $X^1$ is $SO_2$; and r is 1.

In any embodiment herein, the amphoteric fluorosurfactant may be present in the electrolyte from about 200 ppm to about 20,000 ppm. Thus, in any embodiment herein, the electrolyte may include the amphoteric fluorosurfactant in an amount of about 500 ppm, about 600 ppm, about 700 ppm, about 800 ppm, about 900 ppm, about 1,000 ppm, about 2,000 ppm, about 3,000 ppm, about 4,000 ppm, about 5,000 ppm, about 6,000 ppm, about 7,000 ppm, about 8,000 ppm, about 9,000 ppm, about 10,000 ppm, about 11,000 ppm, about 12,000 ppm, about 13,000 ppm, about 14,000 ppm, about 15,000 ppm, about 16,000 ppm, about 17,000 ppm, about 18,000 ppm, about 19,000 ppm, about 20,000 ppm, or ranges between any two of these values (including endpoints). For example, in any embodiment herein, the amphoteric fluorosurfactant may be present in the electrolyte from about 2000 ppm to about 15000 ppm or from about 3000 ppm to about 12000 ppm. By way of another example, in any embodiment herein, it may be the amphoteric fluorosurfactant concentration in the electrolyte is about 10,000 ppm.

The battery may be configured in accordance or consistent with metal-air battery cell designs, such as zinc/silver oxide batteries, zinc/manganese dioxide batteries, etc. For example, the battery may be designed to specifications suitable for a metal-air button size battery. Further, the shape of the battery may such that the anode is held in a somewhat flat or pan-shaped position.

Hereafter, disclosure via references to FIG. 1 is provided to aid in understanding but is not intended mandate the inclusion of the described features in metal-air batteries of the present technology. However, in any embodiment of the present disclosure, the battery of the present disclosure may be as illustrated in FIG. 1. FIG. 1 illustrates that in cell 10 of the battery, the negative electrode contains the anode can assembly 22, with an anode can 24 including an electrochemically reactive anode 26, contained therein and an insulating gasket 60. The anode can 24 has a base wall 28, and circumferential downwardly-depending side wall 30. Side walls 30 terminate in a circumferential can foot 36. The base wall and side walls 30 generally define the anode cavity 38 within the anode can 24, which cavity contains the anode 26.

The anode can 24 may include an alloy of copper, which includes copper and metals such as aluminum, silicon, cobalt, tin, chromium, zinc, and mixtures of any two or more thereof. For example, in any embodiment disclosed herein, the entire anode can 24 may include an alloy of copper.

The cathode 42 comprises the area from below the separator 74 to the cathode can 44. This cathode 42 area includes the porous diffusion layer 57, the cellulose air diffusion layer and the cathode active layer 72. Cathode can 44 has a bottom 46, and a circumferential upstanding side wall 47. Bottom 46 has a generally flat inner surface 48, a generally flat outer surface 50, and an outer perimeter 52 defined on the flat outer surface 50. A plurality of air access ports 54 extend through the bottom 46 of the cathode can 44, providing avenues for traverse of oxygen through the bottom 46 into the adjacent cathode can assembly 40. An air reservoir 55 spaces the cathode can assembly 40 from bottom 46 and the corresponding air access ports 54. A porous diffusion layer 57 and a cellulose air diffusion layer 32 fill the air reservoir 55. Side wall 47 of the cathode can has an inner surface 56 and an outer surface 58.

As noted above, the air access ports 54 define the vent areas through which oxygen may pass into the cell forming a voltaic cell with zinc generating an electric current. In accordance with the surprising observations described herein, when an amphoteric fluorosurfactant is used in the electrolyte of the batteries of the present technology, the minimum required total vent area defined by the air access ports 54 was found to be surprisingly low. As discussed earlier, where the metal-air battery is a size 13 cell the total vent area defined by all of the air access ports in the housing is from about 0.05 mm$^2$ to about 0.1995 mm$^2$. Thus, in any embodiment disclosed herein of a size 13 cell, the total vent area defined by all of the air access ports may be from about 0.05 mm$^2$ to about 0.10 mm$^2$, from about 0.06 mm$^2$ to about 0.095 mm$^2$, from about 0.06 mm$^2$ to about 0.085 mm$^2$, from about 0.07 mm$^2$ to about 0.09 mm$^2$, or from about 0.08 mm$^2$ to about 0.085 mm$^2$.

The anode can assembly 22 is electrically insulated from the cathode can assembly 40 by an insulating gasket 60. Insulating gasket 60 includes a circumferential side wall 62 disposed between the upstanding side wall 47 of the cathode can and the downwardly-depending side wall 30 of the anode can. An insulating gasket foot 64 is disposed generally between the can foot 36 of the anode can and the cathode can assembly 40. An insulating gasket top 66 is positioned at the locus where the side wall 62 of insulating gasket 60 extends from between the side walls 30 and 47 adjacent the top of the cell.

The outer surface 68 of the cell 10 is thus defined by portions of the outer surface of the top of the anode can 24, outer surface 58 of the side wall 47 of the cathode can 44, outer surface 50 of the bottom of the cathode can 44, and the top 66 of the insulating gasket 60.

The insulating gasket 60 performs at least two primary functions. First, the insulating gasket 60 serves as a closure for the cell 10, to prevent anode 26 and/or electrolyte from leaking from the cell between the outer surface of the side wall of the anode can 30 and the inner surface 56 of the side wall of the cathode can 47. Thus, the insulating gasket 60 must possess adequate liquid sealing properties to prevent such leakage. Generally, such properties are available in a variety of resiliently deformable thermoplastic polymeric materials.

Second, the insulating gasket 60 provides electrical insulation, preventing all effective direct electrical contact between the anode can 24 and the cathode can 44. Accordingly, the side wall 62 of the insulating gasket 60 must circumscribe, and provide electrical insulation properties about, the entirety of the circumference of the battery between outer surface and inner surface 56, generally from the top of side wall 47 to the bottom of side wall 30. Similarly, the foot 64 of the insulating gasket 60 must circumscribe, and provide electrical insulation properties about, the entirety of the circumference of the cell between foot 36 of side wall 30, the lower portion of side wall 47, and the outer perimeter portion of the cathode can assembly 40. The combination of good liquid sealing properties and good electrical insulation properties is typically achieved by molding known battery-grade nylon polymeric material in the desired configuration.

In order to meet the electrical insulation requirements, the insulating gasket 60 may have good dielectric insulation properties, may have a minimum thickness about side wall 62, and may be free of any pinholes or other imperfections that might permit transmission of electric current between side walls 30 and 47. Thickness for the insulating gasket side wall 62 of about 200 to about 250 microns are common in conventional electrochemical cells. Thickness as thin as 100 microns are found in higher-performing cells and are acceptable for cells of the disclosure, using the same resiliently deformable thermoplastic nylon material as the thicker insulating gaskets of the conventional art Depending on the structure of the battery to which the insulating gasket is to be applied, intermediate thicknesses such as, e.g., 150 microns, 140 microns, 127 microns, or the like, may be selected for some cells. However, where cell volume efficiency is a driving consideration, preferred thicknesses are less, for example 120 microns or 110 microns to as thin as 100 microns. Thus, the range of thicknesses for insulating gaskets 60 preferred for use in cells 10 of the disclosure has a lower end of about 100 micron. Other methods of insulation, potentially with still thinner insulating materials, are possible and are not incompatible with the material disclosed here.

It should be noted that in this design, the inside diameter of the insulator defines the approximate usable interfacial area between the anode and cathode. However, in other cell designs, a different component may control the interfacial area, and yet the concept of interfacial area is equally important in that case.

In any embodiment disclosed herein, it may be porous diffusion layer 57 is a micro-porous hydrophobic polymeric material such as a polytetrafluoroethylene (PTFE) membrane about 25 to about 100 microns thick, which permits passage of air therethrough and which is generally impervious to battery electrolyte. For example, the porous diffusion layer 57 is Teflon™. In any embodiment disclosed herein, it may be porous diffusion layer 57, in combination with the air access ports 54, is used to efficiently transport oxygen to the active reaction surface area of the cathode assembly.

The cellulose air diffusion layer 32 may be located underneath the porous diffusion layer 57 and act as a protective lateral air diffusion layer. Specifically, when the cell is activated, the anode can assembly 22 presses down on the separator 74 and the cellulose air diffusion layer 32 helps to protect the air access ports 54 from being completely covered.

Active layer 72 may further include a connecting substratum, such as a conductive woven nickel wire layer (not shown), capable of interfacing, as a current collector, with the cathode can. In any embodiment disclosed herein, carbon may form a matrix surrounding the conductive layer of nickel wire. Nickel may be used for the conductive layer because nickel exhibits little or no corrosion in the environment of the zinc air cell, and also because nickel is an excellent electrical conductor. In any embodiment disclosed herein, the thickness of the cathode assembly between the separator 74 and the porous diffusion layer 57 may be as small as possible.

The aqueous electrolyte for the metal-air batteries of the present technology may include a base, such as sodium hydroxide (NaOH), potassium hydroxide (KOH), or a combination thereof. The electrolyte of any embodiment disclosed herein may include a surfactant system, a corrosion inhibitor (e.g., one or more of indium hydroxide, polyaniline, polyethylene glycol, polypropylene glycol, and lithium hydroxide), a gelling agent (e.g., polyacrylate polymer), gas suppressing additive (e.g., one or more of zinc oxide, aluminum hydroxide, LiOH, and calcium bromide), potassium hydroxide, sodium hydroxide, cesium hydroxide, boric acid, sodium borate, potassium borate, sodium stannate, potassium stannate, or a combination of any two or more thereof.

The surfactant system may include at least one amphoteric fluorosurfactant. For example, the surfactant system may include at least two amphoteric fluorosurfactants. In any embodiment herein, it may be the surfactant system includes one or more amphoteric fluorosurfactants as well as one or more of a corrosion inhibitor (e.g., one or more of indium hydroxide, polyaniline, polyethylene glycol, polypropylene glycol, and lithium hydroxide), a gelling agent (e.g., polyacrylate polymer), gas suppressing additive (e.g., one or more of zinc oxide, aluminum hydroxide, LiOH, and calcium bromide), potassium hydroxide, sodium hydroxide, cesium hydroxide, boric acid, sodium borate, potassium borate, sodium stannate, and potassium stannate. In any embodiment disclosed herein, the surfactant system may be CHEMGUARD® S-111, CHEMGUARD® S-500, CAPSTONE® FS-50, CAPSTONE® FS-51, APFS-14, DYNAX DX3001, ZONYL® FSK, ZONYL® FS-500, or a combination of any two or more thereof.

The electrolyte and/or surfactant system of any embodiment herein may include an additional surfactant such as hexyl diphenyl oxide disulfonic acid, diethylenetriamine, octylphenoxypolyethoxyethanol, a compound of Formula (III), or a combinations of any two or more thereof. Compounds of Formula (III) include:

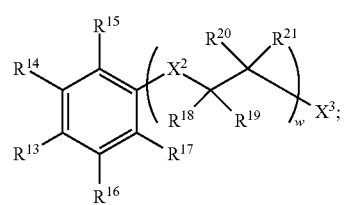

Formula (III)

wherein $R^{13}$, $R^{14}$, $R^{15}$, $R^{16}$, $R^{17}$, $R^{18}$, $R^{19}$, $R^{20}$, and $R^{21}$ are each independently a hydrogen, alkyl, alkenyl, or cycloalkyl group; $X^2$ is O or S; $X^3$ is OH or SH; and w is 5-50. In any embodiment disclosed herein, it may be that $R^{13}$, $R^{14}$, $R^{15}$, $R^{16}$, $R^{17}$, $R^{18}$, $R^{19}$, $R^{20}$, and $R^{21}$ are each hydrogen. In any embodiment disclosed herein, it may be that $X^2$ is O. In any embodiment disclosed herein, it may be that $X^3$ is OH. In any embodiment disclosed herein, it may be that w is 5-15. In any embodiment disclosed herein, it may be that w is 5-10. In any embodiment disclosed herein, it may be that $R^{13}$ is a $C_1$-$C_{12}$ alkyl group; $R^{14}$, $R^{15}$, $R^{16}$, $R^{17}$, $R^{18}$, $R^{19}$, $R^{20}$, and $R^{21}$ are each hydrogen; $X^2$ is O; $X^3$ is OH; and w is 5-15. In any embodiment disclosed herein, it may be that $R^{13}$ is octyl and w is 5-10. In another embodiment, $R^{13}$ is 1,1,3,3-tetramethylbutyl and w is 5-10.

The electrolyte of any embodiment herein may further include a hexyl diphenyl oxide disulfonic acid as part of a hexyl diphenyl oxide disulfonic acid surfactant system. The hexyl diphenyl oxide disulfonic acid surfactant system may reduce voltage suppression. The hexyl diphenyl oxide disulfonic acid surfactant system of any embodiment disclosed herein may have a density of from about 9.0 to about 10.0 lbs./gallon, such as a density of about 9.8 lbs./gallon. The hexyl diphenyl oxide disulfonic acid surfactant system of any embodiment disclosed herein may have a pH of less than about 2.0. The hexyl diphenyl oxide disulfonic acid may have a solubility of about 50% in water.

The hexyl diphenyl oxide disulfonic acid surfactant system of any embodiment disclosed herein may include from about 70% to about 75%, by weight, of sulfonated benzene, 1,1'-oxybis-sec-hexyl derivatives. In any embodiment herein, the hexyl diphenyl oxide disulfonic acid surfactant system may include from about 0% to about 5% or from about 2% to about 4%, by weight, of sulfuric acid. The hexyl diphenyl oxide disulfonic acid of any embodiment disclosed herein may include from about 20% to about 30% or from about 22% to about 28%, by weight, of water. In an exemplary embodiment, the hexyl diphenyl oxide disulfonic acid surfactant is Calfax® 6LA-70, available from Pilot Chemical Company, 2744 East Kemper Road, Cincinnati, Ohio, 45241, where Calfax® 6LA-70 may also act as a coupling agent and/or an HLB modifier in other embodiments of the present disclosure. Thus, the term "surfactant" is not to be seen in a limiting sense as illustrated for Calfax® 6LA-70, but instead the term is a description of one of the functions e.g., that hexyl diphenyl oxide disulfonic acids and/or hexyl diphenyl oxide disulfonic acid surfactant systems may provide.

In any embodiment herein, it may be the hexyl diphenyl oxide disulfonic acid is included in an amount from about 500 ppm to about 5,000 ppm, such as from about 1,000 ppm to about 4,000 ppm or about 2,000 ppm to about 3,000 ppm. Thus, the hexyl diphenyl oxide disulfonic acid may be present in an amount of about 1,000 ppm, about 2,000 ppm, about 3,000 ppm, about 4,000 ppm, or about 5,000 ppm, or any range between any two of these values (including endpoints). For example, the hexyl diphenyl oxide disulfonic acid may be present in an amount of about 3,000 ppm; as another example, the hexyl diphenyl oxide disulfonic acid may be present in an amount of about 4,500 ppm.

The electrolyte of any embodiment disclosed herein may further include a corrosion inhibitor. The corrosion inhibitor may be used to help maintain a clean zinc surface, which in turn increases cell voltage and efficiency. Both the corrosion inhibitor and the amphoteric fluorosurfactant may provide improvements in cell voltage and cell performance. The corrosion inhibitor may enhance conductivity. The corrosion inhibitor may be present in the electrolyte from about 100 ppm to about 15,000 ppm, such as from about 200 ppm to about 300 ppm. In any embodiment herein, it may be the corrosion inhibitor is present in an amount of about 150 ppm, about 200 ppm, about 250 ppm, about 300 ppm, about 350 ppm, or any range between any two of these values (including endpoints). In any embodiment herein, the corrosion inhibitor may be present in an amount of about 250 ppm. With regard to the corrosion inhibitor only, the ppm amount is based upon the total weight of the electrolyte when the corrosion inhibitor is a liquid at room temperature, or it is based upon the zinc weight in the anode when the corrosion inhibitor is a solid at room temperature.

The corrosion inhibitor of any embodiment of the present technology may be an aromatic amine polymer, indium hydroxide, polyaniline, polyethylene glycol, polypropylene glycol, lithium hydroxide, lithium hydroxide monohydrate, lithium hydroxide hydrate, or a combination of any two or more thereof. For example, the corrosion inhibitor may include a compound of Formula (II)

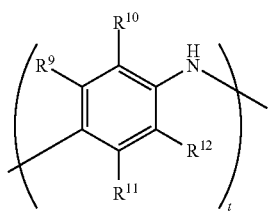

Formula (II)

wherein $R^9$, $R^{10}$, $R^{11}$, and $R^{12}$ are each independently a hydrogen, substituted or unsubstituted alkyl, substituted or unsubstituted alkenyl, or substituted or unsubstituted cycloalkyl group; and t is 100-500. In any embodiment disclosed herein, it may be $R^9$, $R^{10}$, $R^{11}$, and $R^{12}$ are each hydrogen. In any embodiment disclosed herein, it may be, t is 100-200. In any embodiment disclosed herein, it may be $R^9$, $R^{10}$, $R^{11}$, and $R^{12}$ are each hydrogen and m is 100-200.

As discussed above, the corrosion inhibitor may include polyaniline. For example, the polyaniline may be an emeraldine polyaniline. The emeraldine form of polyaniline may be neutral and have a high stability at room temperature. The polyaniline of any embodiment disclosed herein may be a non-acid doped form of polyaniline and not a conductive form of polyaniline. The polyaniline of any embodiment disclosed herein may act as a corrosion inhibitor and/or may provide other benefits that do not limit the polyaniline to acting just as a corrosion inhibitor. Thus, referring to the polyaniline as a "corrosion inhibitor" does not limit the polyaniline to only that particular function. For example, the polyaniline may enhance conductivity.

As discussed above, the corrosion inhibitor may include indium hydroxide. In any embodiment disclosed herein, the indium hydroxide may be present in an amount from about 2,000 ppm to about 4,000 ppm based upon the total weight of the zinc in the anode, such as from about 2,500 ppm to about 3,500 ppm, or from about 2,750 ppm to about 3,250 ppm. Thus, the indium hydroxide may be present in an amount of about 2,000 ppm, about 2,500 ppm, about 3,000 ppm, about 3,500 ppm, about 4,000 ppm, or ranges between any two of these values (including endpoints). For example, the indium hydroxide may be present in any embodiment disclosed herein in an amount of about 3,000 ppm based upon the total weight of the zinc in the anode.

The electrolyte may include a gelling agent. Any suitable gelling agent in the art may be used so long as it does not depart from the scope of the present disclosure. The gelling agent may be present in an amount from about 500 ppm to about 1,500 ppm, about 750 ppm to about 1,250, or about 900 ppm to about 1,100 ppm, based upon the total weight of the electrolyte. Thus, the gelling agent may be present in an amount of about 500 ppm, about 600 ppm, about 700 ppm, about 800 ppm, about 900 ppm, about 1,000 ppm, about 1,100 ppm, about 1,200 ppm, about 1,300 ppm, about 1,400 ppm, or about 1,500 ppm, or ranges between any two of these values (including endpoints). For example, the gelling agent may be present in any embodiment disclosed herein in an amount of about 1,000 ppm. In any embodiment disclosed herein, the gelling agent may be a polyacrylic acid polymer, such as a cross-linked polyacrylic acid polymer.

The electrolyte may include a polyacrylate polymer. The polyacrylate polymer may be present in an amount from about 1,000 ppm to about 5,000 ppm. This may include from about 2,000 ppm to about 4,000 ppm, or from about 2,500 ppm to about 3,500 ppm. Thus, the polyacrylate polymer may be present in any embodiment disclosed herein in an amount of about 2,000 ppm, about 2,500 ppm, about 3,000 ppm, about 3,500 ppm, about 4,000 ppm, or ranges between any two of these values (including endpoints). For example, the polyacrylate polymer may be present in an amount of about 2,000 ppm. By way of example, a suitable polyacrylate polymer is a cross-linked polyacrylate polymer.

Zinc oxide may be present in an amount from about 1% to about 10%, by weight of the electrolyte. This may include about 1% to about 8%, 1% to about 5%, about 1.5 to about 5%, or about 2 to about 5%, by weight of the electrolyte. Thus, the zinc oxide may be present in any embodiment disclosed herein in an amount of about 1%, about 1.5%, about 2%, about 2.5%, about 3%, about 3.5%, or about 4%, by weight of the electrolyte, or ranges between any two of these values (including endpoints). For example, the zinc oxide may be present in an amount of about 2%, by weight of the electrolyte. The zinc oxide may provide other benefits that do not limit the zinc oxide to acting just as a gas suppressing additive, and therefore referring to the zinc oxide as a "gas suppressing additive" does not limit the zinc oxide to only that particular function. For example, the zinc oxide of any embodiment disclosed herein may regulate zinc surface passivation.

The electrolyte may include potassium hydroxide. The potassium hydroxide may be present in an amount of from about 20% to about 45%, by weight of the electrolyte, such as from about 25% to about 40% or from about 30% to about 35%, by weight of the electrolyte. In any embodiment disclosed herein, the potassium hydroxide may be present in an amount of about 45%, about 30%, about 25%, or about 20%, by weight of the electrolyte, or ranges between any two of these values (including endpoints). For example, the potassium hydroxide may be present in an amount of about 33%, by weight of the electrolyte.

The electrolyte may include sodium hydroxide. The sodium hydroxide may be present in an amount of from about 20% to about 45%, such as from about 25% to about 40% or from about 30% to about 35%, by weight of the electrolyte. The sodium hydroxide may be present in any embodiment disclosed herein in an amount of about 45%, about 30%, about 25%, or about 20%, by weight of the electrolyte, or ranges between any two of these values (including endpoints). For example, the sodium hydroxide may be present in an amount of about 33%, by weight of the electrolyte.

In any embodiment disclosed herein, the electrolyte of the metal-air battery may include a surfactant system and a corrosion inhibitor, where the surfactant system includes the amphoteric fluorosurfactant. The surfactant system may further include a gas suppressing additive. In any embodiment disclosed herein, the surfactant system may further includes hexyl diphenyl oxide disulfonic acid, diethylenetriamine, or octylphenoxypolyethoxyethanol, a compound of Formula (III), or a combination of any two or more thereof. Gas suppressing additives may include materials such as LiOH or ZnO. In any embodiment disclosed herein, the electrolyte may include from about 500 ppm to about 20,000 ppm of a gas suppressing additive. Thus, the electrolyte may include gas suppressing additives in an amount of about 500 ppm, about 600 ppm, about 700 ppm, about 800 ppm, about 900 ppm, about 1,000 ppm, about 2,000 ppm, about 3,000 ppm, about 4,000 ppm, about 5,000 ppm, about 6,000 ppm, about 7,000 ppm, about 8,000 ppm, about 9,000 ppm, about 10,000 ppm, about 11,000 ppm, about 12,000 ppm, about 13,000 ppm, about 14,000 ppm, about 15,000 ppm, about 16,000 ppm, about 17,000 ppm, about 18,000 ppm, about 19,000 ppm, about 20,000 ppm, or ranges between any two of these values (including endpoints).

The electrolyte of any embodiment disclosed herein may include LiOH in an amount of about 500 ppm, about 600 ppm, about 700 ppm, about 800 ppm, about 900 ppm, about 1,000 ppm, about 2,000 ppm, about 3,000 ppm, about 4,000 ppm, about 5,000 ppm, about 6,000 ppm, about 7,000 ppm, about 8,000 ppm, about 9,000 ppm, about 10,000 ppm, about 11,000 ppm, about 12,000 ppm, about 13,000 ppm, about 14,000 ppm, about 15,000 ppm, about 16,000 ppm, about 17,000 ppm, about 18,000 ppm, about 19,000 ppm, about 20,000 ppm, about 21,000 ppm, about 22,000 ppm, about 23,000 ppm, about 24,000 ppm, about 25,000 ppm or ranges between any two of these values (including endpoints).

The metal-air battery of any embodiment disclosed herein may include a carbon dioxide scrubbing agent to improve cell-performance and life. As the air enters the cell, the carbon dioxide reacts with the carbon dioxide scrubber, to prevent, or at least minimize, the reaction of the carbon dioxide with alkaline components in the electrolyte or at the surface of an air diffusion membrane. The scrubbers allow for the conductivity of the electrolyte and the cathode porosity to be maintained for an extended period of time. The electrolyte of any embodiment disclosed herein may be seeded with materials that preferentially react with dissolved carbon dioxide prior to reaction with alkali hydroxides that are present in the electrolyte.

Illustrative carbon dioxide scrubbers include, but are not limited to, lithium hydroxide, calcium hydroxide, lithium peroxide, lithium oxide, an amine, an olivine, or other basic hydroxides.

In any embodiment disclosed herein the carbon dioxide scrubbing agent may be used to coat the inside of the cathode can in a space where entering air may encounter the scrubbing agent prior to contacting the anode active material (i.e. the zinc). For example, as illustrated in FIG. 1, air reservoir 55 is a void space within the battery cell. The cell is configured such that air enters the cell through air access ports 54 prior to contacting the diffusion layer 32. Accordingly, the carbon dioxide scrubbing agent may be applied to an interior surface of the cell, within the air reservoir 55, to remove or at least mitigate carbon dioxide as it enters the cell through the air access ports 54. The scrubbing agent may also be embedded within or deposited on any of the cellulose air diffusion layer 32, the cathode 42, or the porous diffusion layer 57. The scrubbing agent may be deposited as a powder, as a film by applying it through a solvent that is later removed, or by other practical means.

In any embodiment disclosed herein, the carbon dioxide scrubbing agents may be added to the alkaline electrolyte. In such embodiments, the scrubbing agents are selected such that the material reactions with carbon dioxide first, while preserving the NaOH or KOH that is present in the electrolyte. Without being bound by theory, it is believed that as $CO_2$ enters a zinc-air cell, the $CO_2$ can dissolve in the aqueous electrolyte, thereby forming carbonic acid. The carbonic acid may then react with the scrubber prior to reaction with the NaOH or KOH present in the electrolyte, such that the desired alkalinity of the electrolyte is maintained.

In any embodiment disclosed herein, a carbon dioxide scrubbing agent may be included in packaging that contains a hearing aid cell (according to the present technology) to minimize storage damage due to carbon dioxide exposure, prior to use of the cell. For example, the packaging may contain a chamber which is intended for holding a zinc-air cell, such as a hearing aid battery, for storage or sale. The packaging may include any of the carbon dioxide scrubbing agents as powders, coatings on the packaging materials, or embedded within the plastics or papers that make up the packaging and chamber forming materials.

The anode includes an anode active material, and an anode can assembly may surround the anode active material. In any embodiment disclosed herein, the anode active material may include zinc and the anode referred to as a "zinc anode." In this regard, it is to be noted that, as used herein, anode "active material" may refer to a single chemical compound that is part of the discharge reaction at the anode of a cell and contributes to the cell discharge capacity, including impurities and small amounts of other moieties that may be present therein. Anode "active material" does not include current collectors, electrode leads, etc., that may contain or support the zinc active material.

Physical modifications to the anode may also improve cell service life, either alone or in combination with chemical modifications noted above. For example, one can efficiently discharge cells having an advantageously lower concentration of hydroxide ions in the electrolyte than can be used in conventional cells by reducing diffusion resistance for the hydroxide ions. This can be accomplished, for example, by adjusting the zinc particle size distribution to provide in the anode a narrow distribution of similar zinc particle sizes, thereby enhancing porosity (diffusion paths) for the hydroxide ions. In addition to improving diffusion properties, the particle size distributions of this disclosure also provide the porosity sites for the precipitation of ZnO, thereby delaying anode passivation. This approach is effective for use in the anodes of zinc air battery cells and can be used in combination with other improvements disclosed herein.

Suitable zinc particle size distribution is one in which at least 70% of the particles have a standard mesh-sieved particle size within a 100 micron size range and in which the mode of the distribution is between about 100 and about 300 microns. A suitable zinc particle size distribution includes particle size distributions meeting the above-noted tests and having a mode of about 100 microns, about 150 microns, or about 200 microns. In any embodiment disclosed herein, it may be about 70% of the particles are distributed in a size distribution range narrower than about 100 microns, for example about 50 microns, or about 40 microns, or less.

The positive electrode may include a cathode can assembly 40, which includes a cathode can 44 and the cathode 42. An exemplary embodiment of the cathode 42 is best seen in FIG. 1. An active layer 72 of the cathode 42 is interposed between the separator 74 and the porous diffusion layer 57. Active layer 72 ranges preferably between about 50 microns and about 1,250 microns thick, and facilitates the reaction between the hydroxyl ions in the electrolyte and the cathodic oxygen of the air. The separator 74 may include or consist of one or both of a micro-porous plastic membrane and a micro-porous cellulosic paper. The micro-porous plastic membrane is about 25 microns thick and typically composed of polypropylene. The paper material is 70-90 microns thick with a basis weight of 20 to 25 g/m$^2$, and typically composed of polyvinyl alcohol and cellulosic material. The separator has the primary function of preventing anodic zinc particles from coming into physical contact with the remaining elements of the cathode 42. The separator 74 however, does permit passage of hydroxyl ions and water therethrough to the cathode assembly. Here, the cathode is an air cathode and the cathode active layer includes carbon.

The side wall 47 of the cathode can 44 is joined to the bottom 46 of the can by intermediate element 80. The outer surface of intermediate element 80 extends, from its lower end at outer perimeter 52 of outer surface 50 of bottom 46, to its upper end which joins the outer surface 58 of the side wall 47 in a generally vertical orientation. The inner surface, if any, of the intermediate element 80 is represented at the joinder of the inner surface 48 of the bottom 46 and the inner surface 56 of the side wall 47. The inner surfaces 48 and 56 may come together at a sharp corner, such that the inner surface of the intermediate element is of nominal dimension. To the extent the corner material is worked in forming the corner, the corner may be work hardened, whereby the corner structure is strengthened with respect to bottom 46 and side wall 47 as the corner structure is formed at intermediate element 80.

In any embodiment disclosed herein, the can/housing may be formed entirely of a metal or alloy having a hydrogen overvoltage similar to that of the cathode (as opposed to plating or cladding the can) so long as sufficient strength and ductility are available from the material selected. Materials in addition to nickel, having such hydrogen overvoltage properties, include, for example and without limitation, cobalt and gold. In some embodiments, such materials may be coated as one or more coating layers onto the core layer by, for example, plating, cladding, or other application processes. The materials which provide sufficient strength and ductility may also be used as single layer materials in place of the composite structure. Single layer materials comprehend CRS or other suitable material as a core layer.

In any embodiment disclosed herein, a steel strip plated with nickel and nickel alloy may be used because of cost considerations, and because pre-plated steel strip, which generally requires no post-plating processes, is commercially available. The metal in the can/housing is preferably both ductile enough to withstand the drawing process, and strong and rigid enough, to tolerate and otherwise withstand cell crimping and closure processes as well as to provide primary overall structural strength to the cell/battery.

In any embodiment disclosed herein, the housing may be include nickel-clad stainless steel; cold-rolled steel plated with nickel; INCONEL® (a non-magnetic alloy of nickel); pure nickel with minor alloying elements (e.g. Nickel 200 and related family of Nickel 200 alloys such as Nickel 201, etc.), all available from Huntington Alloys, or DURANICKEL® 301, available from Special Metals. For example, the housing may be made of nickel-plated stainless steel. Some noble metals may also find use as plating, cladding, or other coating for can/housing metals, including covering steel strip plated with nickel, and mild steel strip subsequently plated with nickel after fabricating the can.

Where multiple layers are used (e.g., CRS) coated on opposing sides with nickel, the present disclosure contemplates optional additional (e.g. fourth, fifth, etc.) layers, either between the nickel and CRS, or with a nickel layer between the CRS and the additional layer(s). For example, gold, cobalt, or other excellent electrical conductor can be deposited on some or all of the outer surface of the cathode can (outside the nickel layer) after the can is drawn, or drawn and ironed. As an alternative, such fourth etc. layer can be, for example, a bond-enhancing layer between the CRS and the nickel.

Where the can/housing is fabricated using a typical raw material structure of nickel/stainless steel (SST)/nickel/NI/SST/NI as the sheet structure, such sheet structure may be from about 0.05 mm to about 0.3 mm. This may include about 0.076 mm to about 0.25 mm or about 0.1 mm to about 0.15 mm—thus, the thickness may be about 0.05 mm, about 0.076 mm, about 0.1 mm, about 0.13 mm, or about 0.15 mm, or ranges between any two of these values (including endpoints). For example, the thickness may be about 0.13 mm. In any embodiment disclosed herein, it may be each of the nickel layers represents about 1% to about 10%, of the overall thickness of the metal sheet in such 3-layer structure. This may include about 1.5% to about 9%, about 2% to about 8%, about 2.5% to about 7%, or about 3% to about 6.5%, of the overall thickness of the metal sheet in such 3-layer structure. For example, each of the nickel layers represents about 2% to about 4%, of the overall thickness of the metal sheet in such 3-layer structure. In any embodiment disclosed herein, it may be each of the nickel layers represents about 2%, of the overall thickness of the metal sheet in such 3-layer structure.

The present invention, thus generally described, will be understood more readily by reference to the following examples, which are provided by way of illustration and are not intended to be limiting of the present invention.

EXAMPLES

Example 1. Size 312 cells of the present technology with a total vent area of 0.0498 mm$^2$ were prepared using a zinc anode and an aqueous electrolyte that included (by weight of the electrolyte) 31.5% potassium hydroxide, 10,000 ppm of an amphoteric fluorosurfactant, 1.5% lithium hydroxide, 2% zinc oxide, and 1,000 ppm polyacrylic acid. Comparative "standard" cells were likewise prepared but with the exception that the standard cells did not include an amphoteric fluorosurfactant and that the total vent area was 0.1329 mm$^2$. The cells were discharged according to the ANSI/IEC test 10/2 mA at 80% RH (relative humidity), where the cells of the present technology exhibited an improvement in capacity of about 15% over the comparative "standard" cells.

Figure 2:
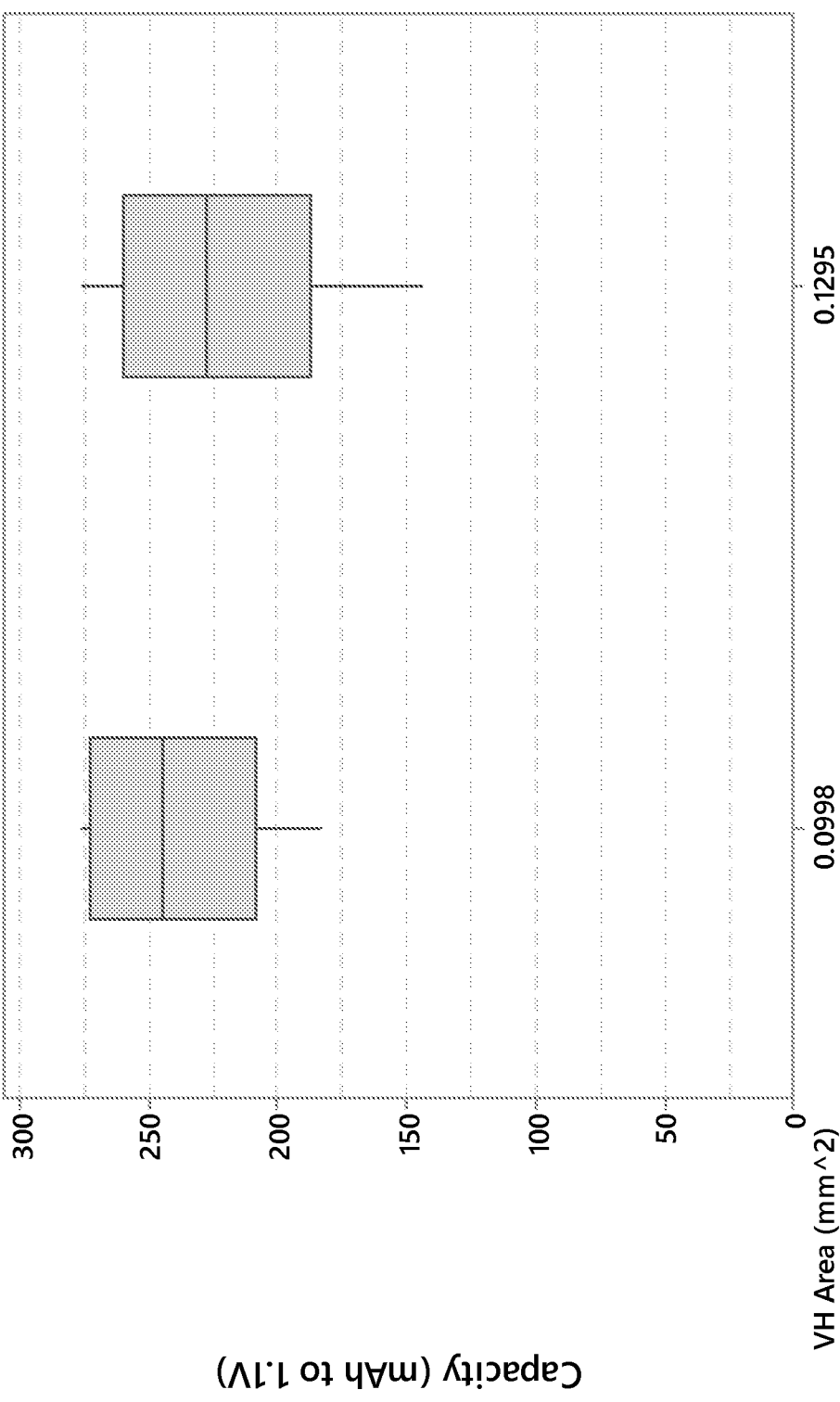
FIG. 2 is a boxplot of capacity data for an embodiment of size 13 cells of the present technology versus a comparative "standard" cell discharged according to the ANSI/IEC test 10/2 mA at 80% RH (relative humidity), according to the working examples.

Example 2. Size 13 cells of the present technology with a total vent area of 0.0998 mm$^2$ were prepared using a zinc anode and an aqueous electrolyte that included potassium hydroxide, the amphoteric fluorosurfactant of Example 1, lithium hydroxide, and the polyacrylic acid of Example 1 in the same amounts as for the electrolyte of Example 1. Comparative "standard" cells were likewise prepared but with the exception that the standard cells did not include an amphoteric fluorosurfactant and that the total vent area was 0.1295 mm$^2$. The cells were discharged according to the ANSI/IEC test 12/3 mA at 80% RH (relative humidity), where the cells of the present technology exhibited an improvement in capacity of about 7% over the comparative "standard" cells (FIG. 2).

Figure 3:
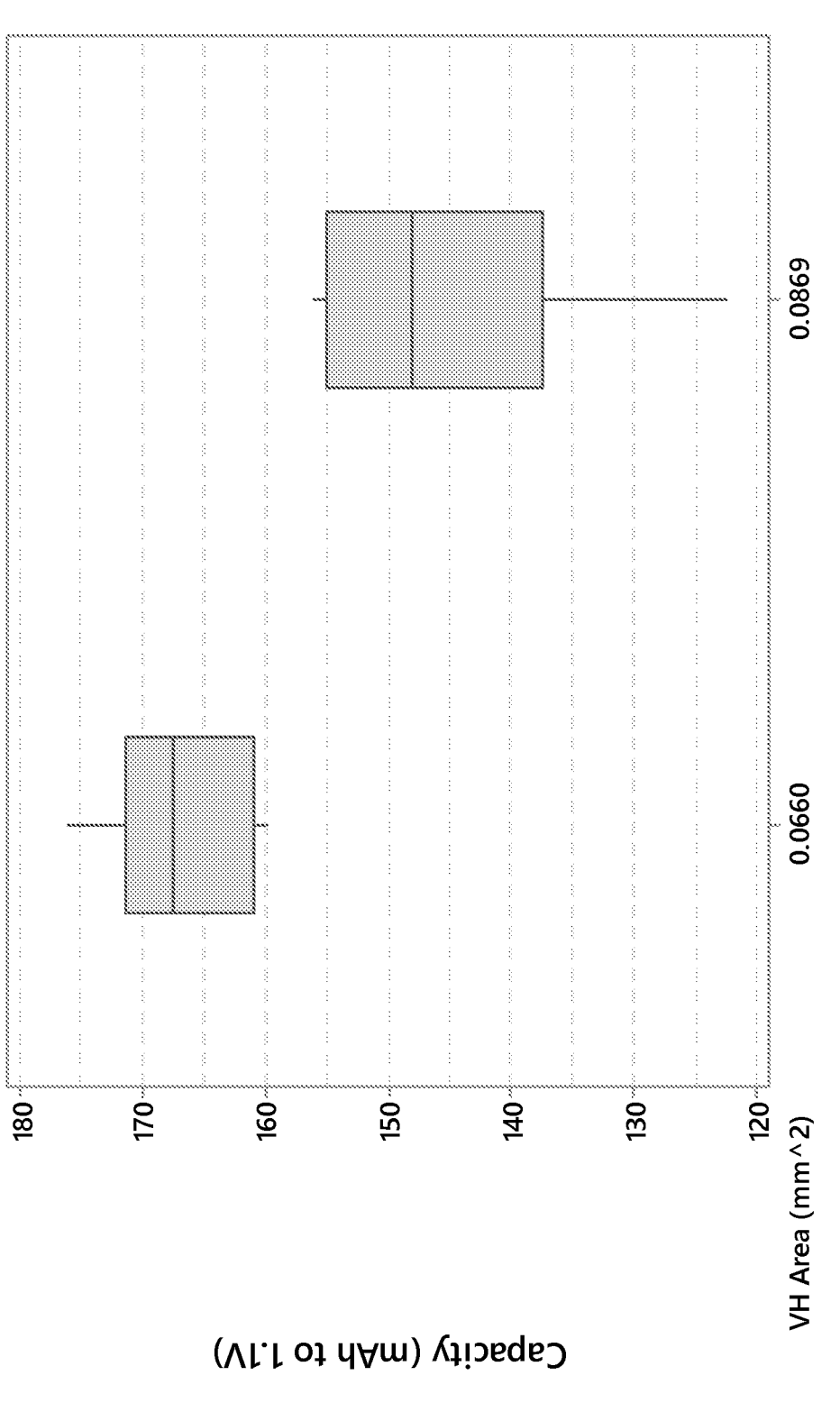
FIG. 3 is a boxplot of capacity data for an embodiment of size 312 cells of the present technology versus a comparative "standard" cell discharged according to the ANSI/IEC test 10/2 mA at 80% RH (relative humidity), according to the working examples.

Example 3. Size 312 cells of the present technology with a total vent area of 0.0660 mm$^2$ were prepared using a zinc anode and an aqueous electrolyte that included potassium hydroxide, the amphoteric fluorosurfactant of Example 1, lithium hydroxide, and the polyacrylic acid of Example 1 in the same amounts as for the electrolyte of Example 1. Comparative "standard" cells were likewise prepared but with the exception that the standard cells did not include an amphoteric fluorosurfactant and that the total vent area was 0.0869 mm$^2$. The cells were discharged according to the ANSI/IEC test 10/2 mA at 80% RH (relative humidity), where the cells of the present technology exhibited an improvement in capacity of about 13% over the comparative "standard" cells (FIG. 3).

Figure 4:
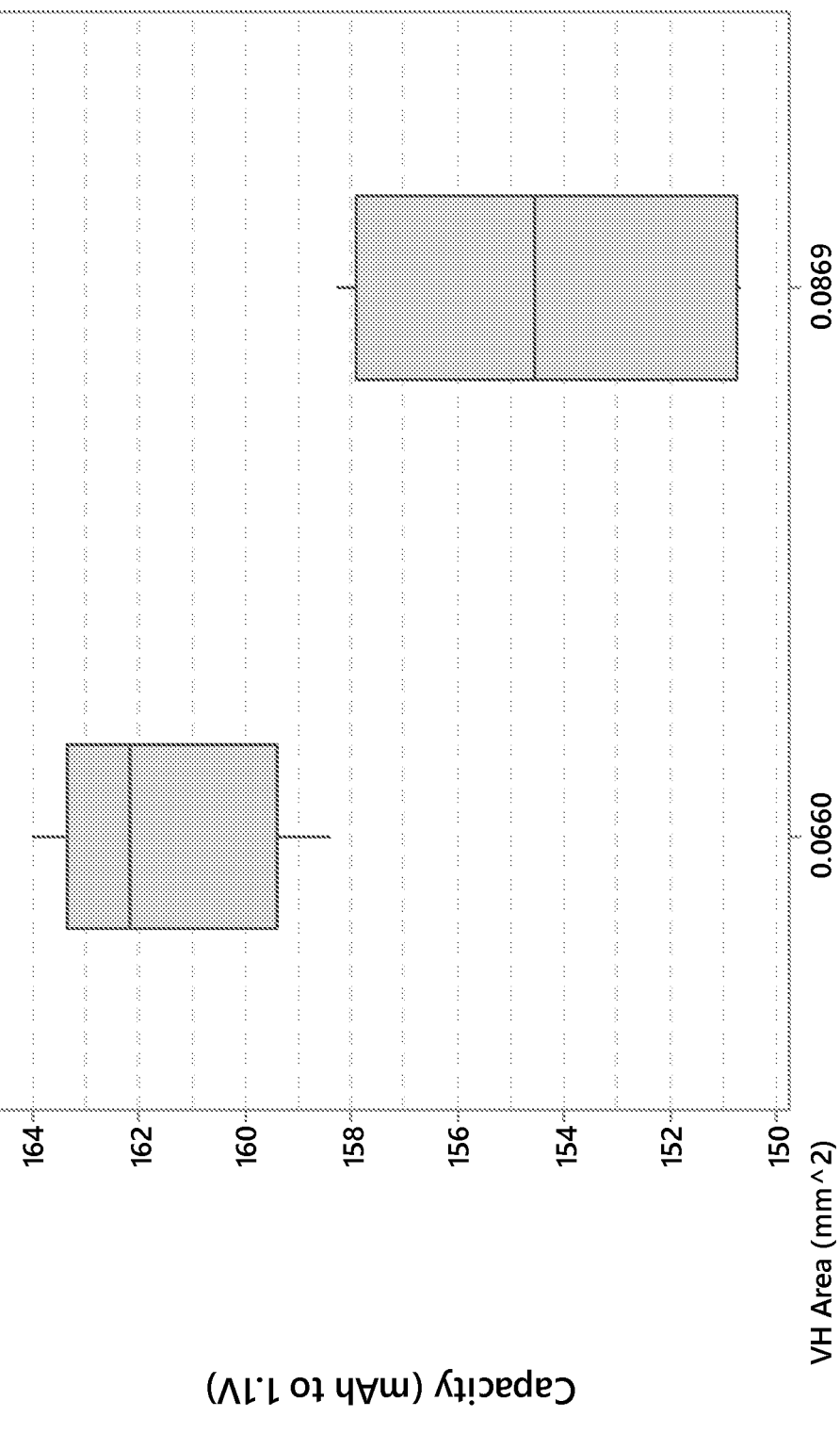
FIG. 4 is a boxplot of capacity data for an embodiment of size 312 cells of the present technology versus a comparative "standard" cell discharged according to the ANSI/IEC test 10/2 mA at 20% RH (relative humidity), according to the working examples.

Example 4. Size 312 cells of the present technology with a total vent area of 0.0660 mm$^2$ were prepared using a zinc anode and an aqueous electrolyte that included potassium hydroxide, the amphoteric fluorosurfactant of Example 1, lithium hydroxide, and the polyacrylic acid of Example 1 in the same amounts as for the electrolyte of Example 1. Comparative "standard" cells were likewise prepared but with the exception that the standard cells did not include an amphoteric fluorosurfactant and that the total vent area was 0.0869 mm$^2$. The cells were discharged according to the ANSI/IEC test 10/2 mA at 20% RH (relative humidity), where the cells of the present technology exhibited an improvement in capacity of about 4% over the "comparative" standard cells (FIG. 4).

Example 5. To further illustrate the contributions of the electrolyte itself to the performance of the batteries of the present technology, three aqueous electrolytes were generated and assessed as follows. The three electrolytes were:

(1) an aqueous electrolyte including 33% potassium hydroxide (by weight of the electrolyte) and 2% zinc oxide (by weight of the electrolyte);

(2) an aqueous electrolyte including 33% potassium hydroxide (by weight of the electrolyte), 2% zinc oxide (by weight of the electrolyte), and 7,500 ppm of a carboxylated amine surfactant; and (3) an aqueous electrolyte of the present technology, including 33% potassium hydroxide (by weight of the electrolyte), 2% zinc oxide (by weight of the electrolyte), and 10,000 ppm of an amphoteric fluorosurfactant.

Figure 5:
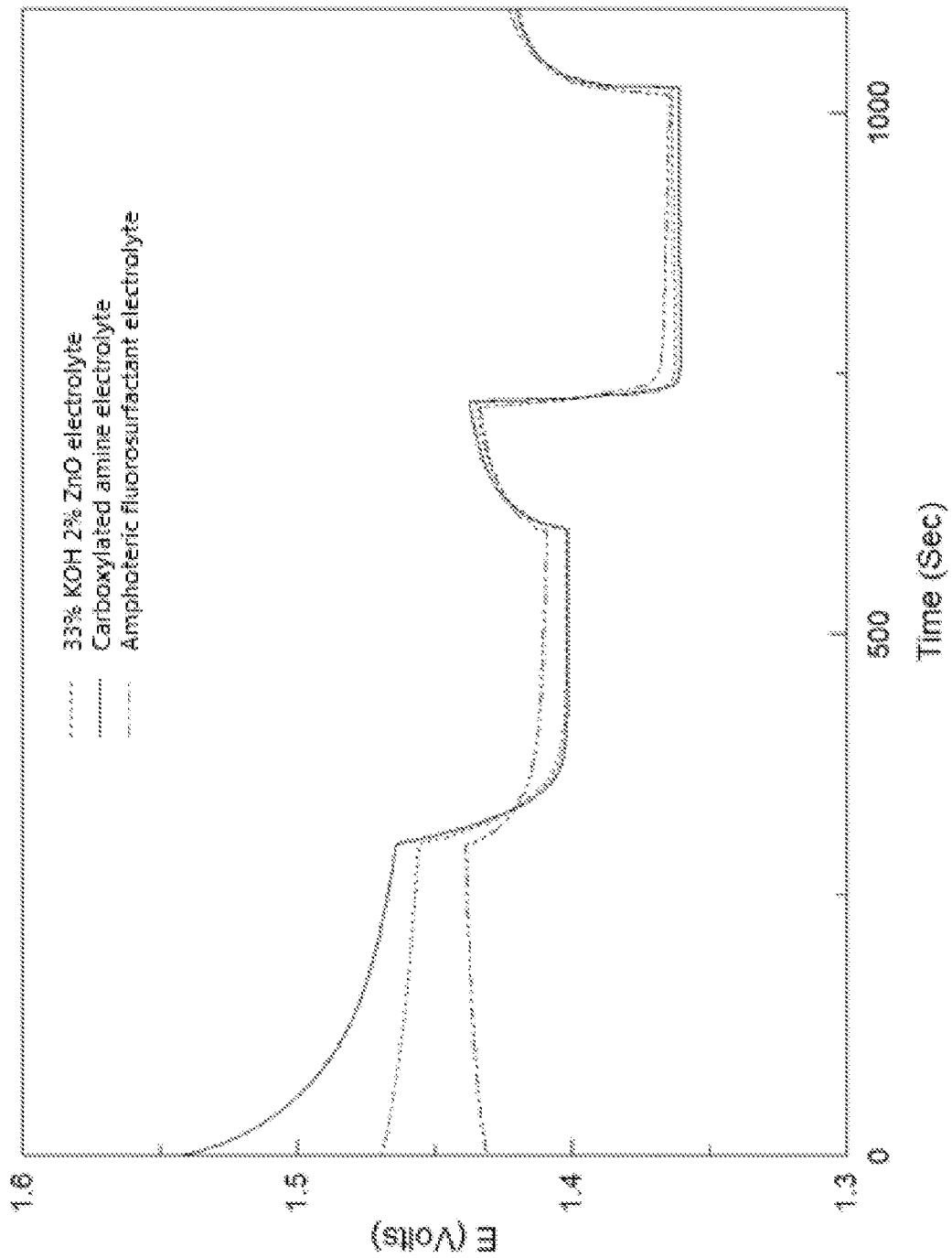
FIG. 5 is a plot of the potential versus a pure zinc reference when a current draw of 1 mA/cm$^2$ and 5 mA/cm$^2$ was applied to the cathode of a metal-air cell employing three different electrolytes, according to the examples.

Cathode performance resulting from use of an electrolyte was tested independently from anode performance by placing a pure zinc reference electrode in the solution close to the cathode (note: the same distance from the cathode was used for all tests), where the cathode had unlimited air access on one side and was exposed to the electrolyte on the other side ("cathode half cell"). Subsequently, a current draw of 1 mA/cm$^2$ and 5 mA/cm$^2$ were applied to the cathode and the potential versus the pure zinc reference was recorded for each electrolyte described above. As illustrated in FIG. 5, the aqueous electrolyte of the present technology (3) exhibited improved behavior with less voltage drop with the same current draw over aqueous electrolytes (1) and (2).

Figure 6:
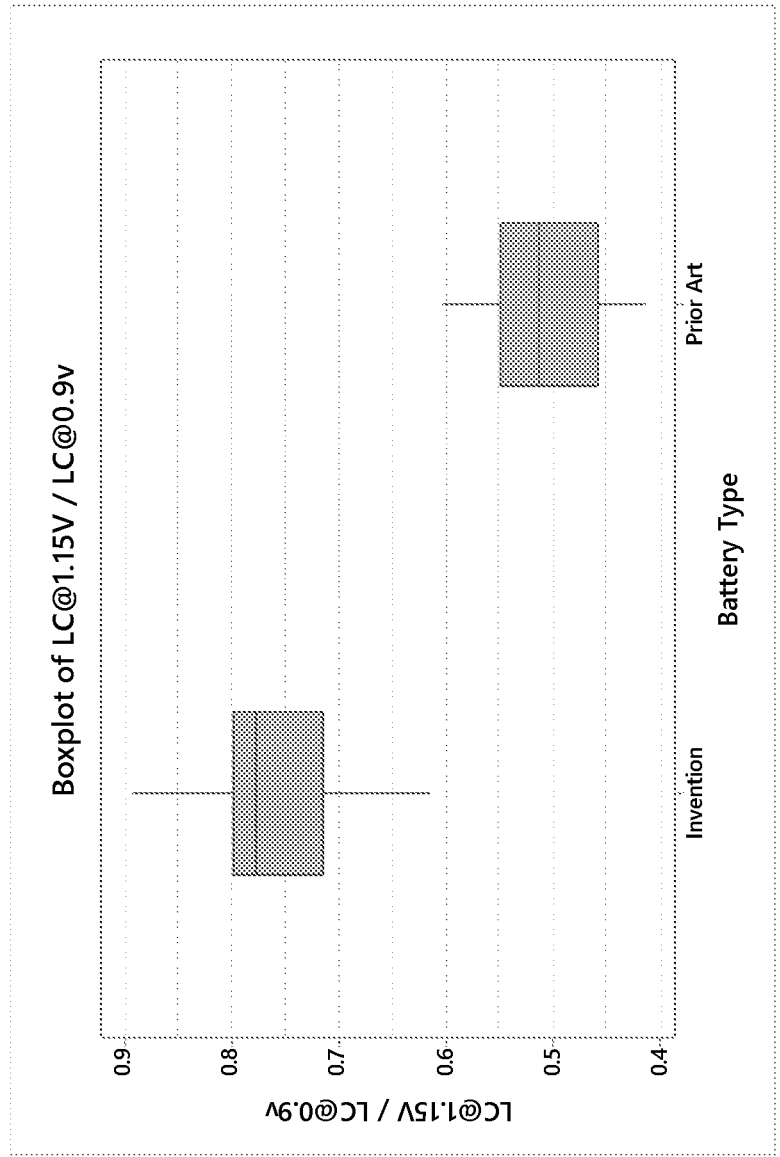
FIG. 6 is a plot of the ratio of the limiting current at 1.15V to the limiting current at 0.9V for cells according to the present application (left) v. commercial cells (right), according to the working examples.
Figure 7:
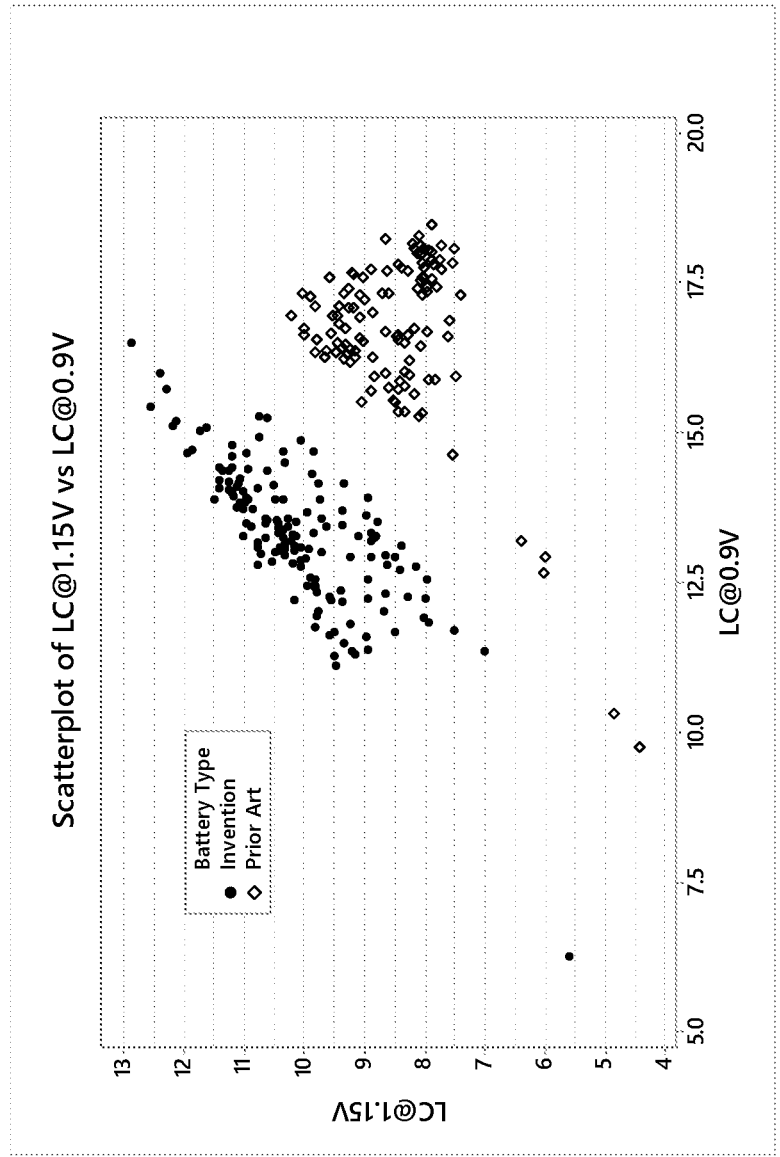
FIG. 7 is a scatterplot of limiting current at 1.15V vs. limiting current at 0.9V for cells according to the present application (dark dots) and commercial cells (hollow diamond shapes), according to the working examples.

Example 6. To further illustrate the difference between the present technology and prior art, a large number of size 13 cells of each type were tested for limiting current at 1.15V and 0.9V. It is observed that the ratio of limiting current at 1.15V to limiting current at 0.9V is greater for the present technology than for commercial cells. FIG. 6 illustrates the ratio for both cell types. To examine in further detail, the limiting current at 1.15V was plotted against limiting current at 0.9V for multiple cells of each type. It is observed that both limiting currents vary from cell to cell, but are correlated with each other, having a relatively constant ratio that is a characteristic of the present technology vs. commercial cells.

Figure 8:
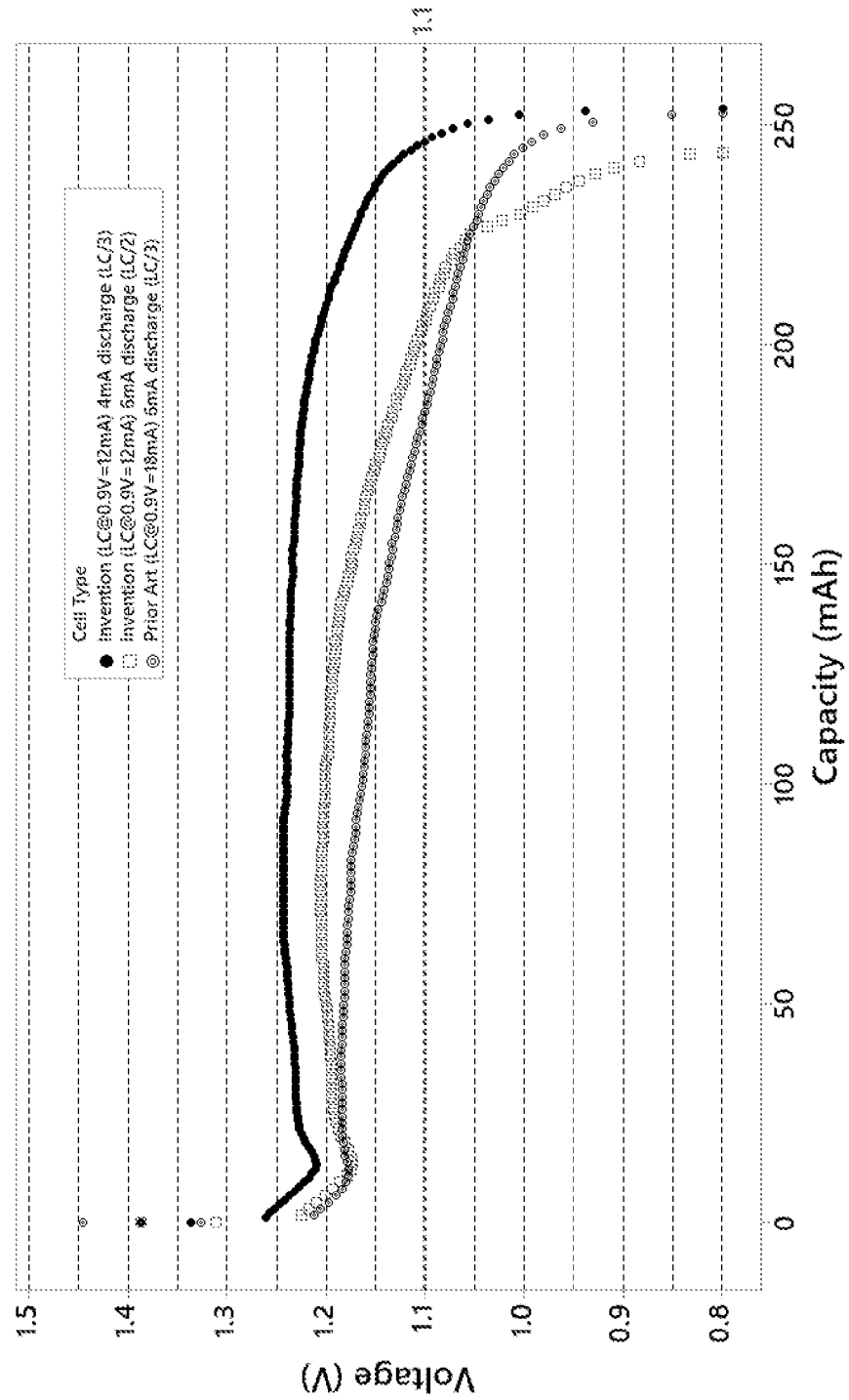
FIG. 8 is a set of discharge curves at constant currents for two size 13 cells according to the present application and one commercial cell for reference, showing the closed circuit voltage during discharge (V) vs. the capacity (mAh). Refer to example 8.

Example 7. Size 13 cells were discharged at constant current, shown in FIG. 8. The cell of the present technology has limiting current at 0.9V of 12 mA. When discharged at a rate of 4 mA, or one-third of the limiting current at 0.9V, it provides a voltage greater than 1.2V through the majority of the discharge. This is particularly important since many practical devices send "low battery" warnings to the user when the voltage drops below about 1.1V.

When the cell of the present technology is discharged at 6 mA, or half of the limiting current at 0.9V, it is still able to provide voltage greater than 1.17V through the first half of discharge.

By comparison, a commercially available cell with limiting current at 0.9V of 18 mA, discharged at 6 mA, is reflecting a current drain equal to one-third of the limiting current at 0.9V. It provides lower voltage than the present technology. In addition, the higher limiting current will lead to more moisture and carbon dioxide transport, affecting the cell negatively, particularly in lower-rate conditions in which the time of discharge is longer.

Figure 9:
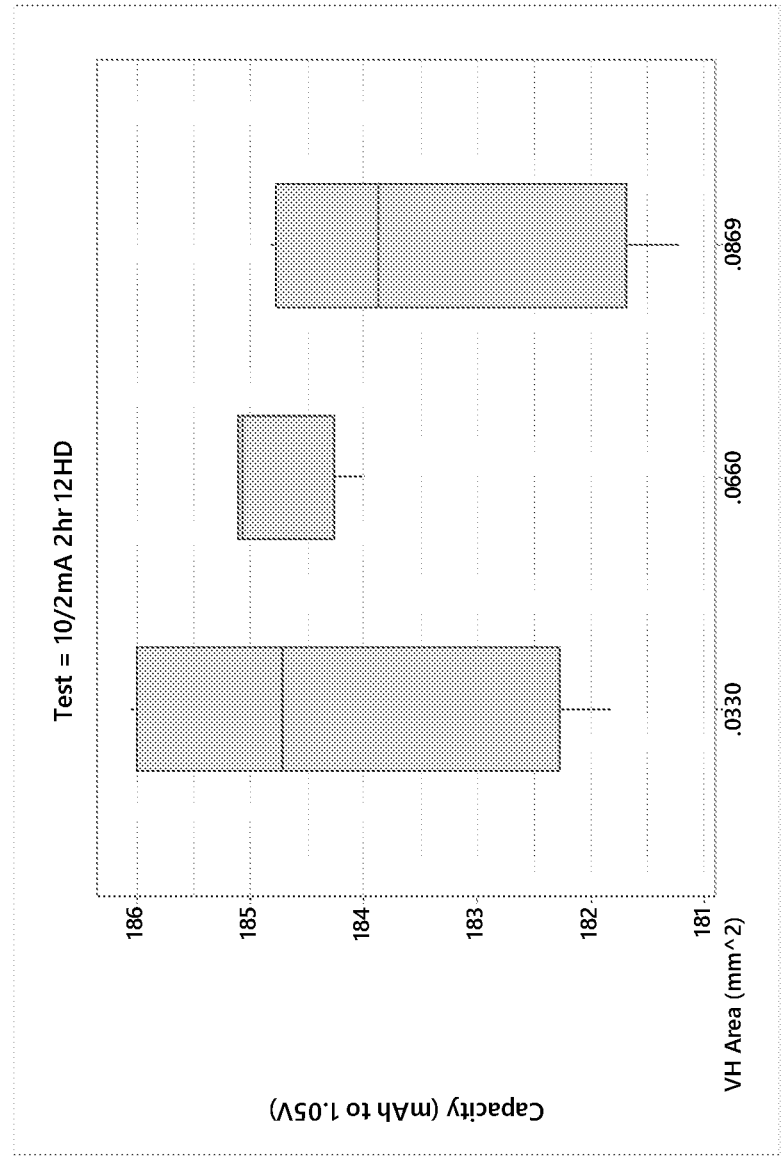
FIG. 9 is a set of discharge curves at constant currents for two size 13 cells according to the present application and one commercial cell for reference, showing the closed circuit voltage during discharge (V) vs. the capacity (mAh). Refer to example 8.
Figure 10:
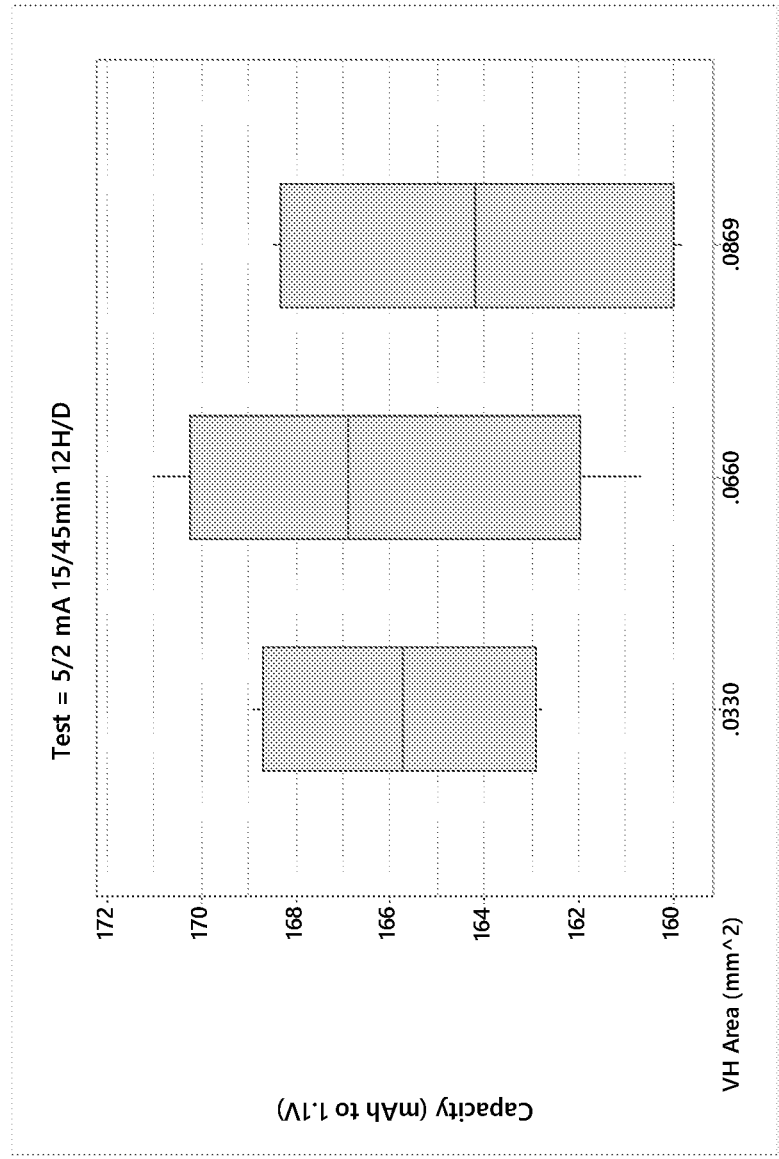
FIG. 10 is a boxplot of capacity data for an embodiment of size 312 cells of the present technology with three different total vent areas in the range of 0.0330 mm$^2$ to 0.0869 mm$^2$ discharged according to the ANSI/IEC test 10/2 mA at 50% RH (relative humidity), according to the working examples.

Example 8. In another test, the present technology is found to enable even smaller vent areas. Size 312 cells of the present technology with three different total vent areas from 0.0330 mm$^2$ to 0.0869 mm$^2$ were prepared using a zinc anode and an aqueous electrolyte that included potassium hydroxide, the amphoteric fluorosurfactant of Example 1, lithium hydroxide, and the polyacrylic acid of Example 1. The cells were discharged according to the ANSI/IEC test 10/2 mA at 50% RH (relative humidity) and the ANSI/IEC test 5/2 mA at 50% RH, where the cells of the present technology exhibited no statistical difference in capacity of over the range of tested total vent areas (FIG. 9, FIG. 10).

Figure 11:
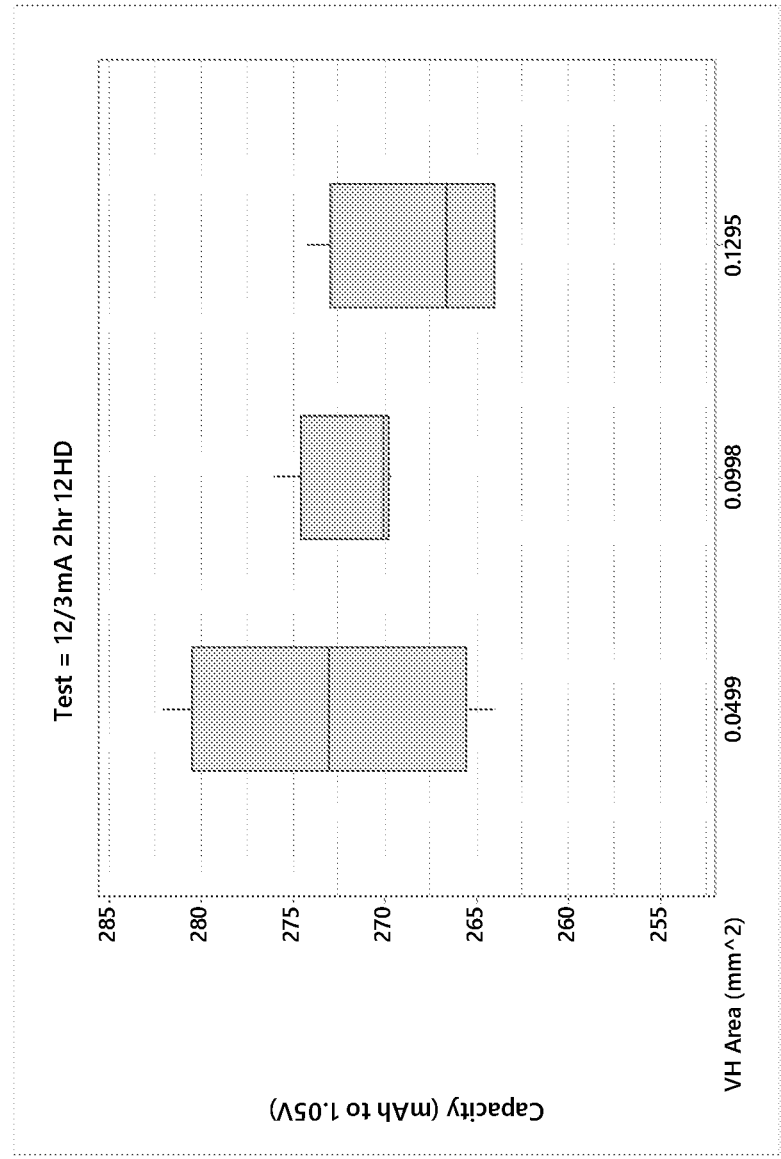
FIG. 11 is a boxplot of capacity data for an embodiment of size 312 cells of the present technology with three different total vent areas in the range of 0.0330 mm$^2$ to 0.0869 mm$^2$ discharged according to the ANSI/IEC test 5/2 mA at 50% RH (relative humidity), according to the working examples.
Figure 12:
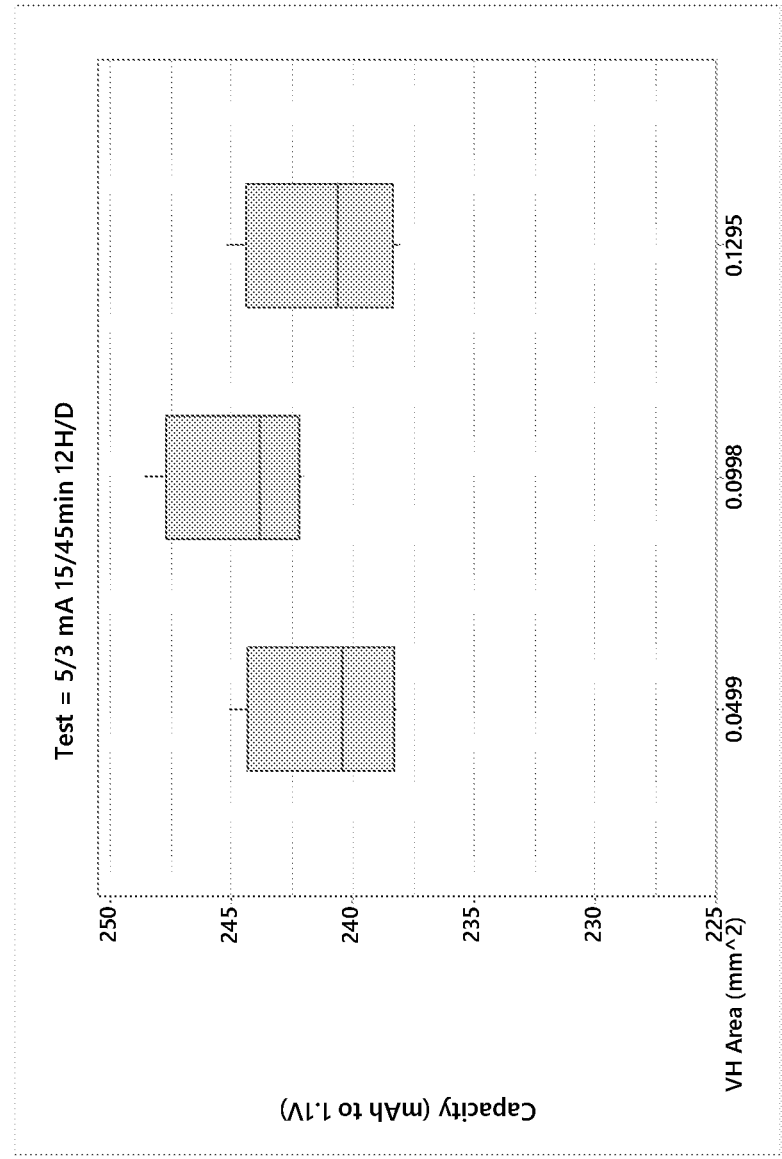
FIG. 12 is a boxplot of capacity data for an embodiment of size 13 cells of the present technology with three different total vent areas in the range of 0.0499 mm$^2$ to 0.1295 mm$^2$ discharged according to the ANSI/IEC test 12/3 mA at 50% RH (relative humidity), according to the working examples.

Example 9. Size 13 cells of the present technology with three different total vent areas in the range of 0.0499 mm$^2$ to 0.1295 mm$^2$ were prepared using a zinc anode and an aqueous electrolyte that included potassium hydroxide, the amphoteric fluorosurfactant of Example 1, lithium hydroxide, and the polyacrylic acid of Example 1. The cells were discharged according to the ANSI/IEC test 12/3 mA at 50% RH (relative humidity) and the ANSI/IEC test 5/3 mA at 50% RH, where the cells of the present technology exhibited no statistical difference in capacity of over the range of tested total vent areas (FIG. 11, FIG. 12).

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The present technology may include, but is not limited to, the features and combinations of features recited in the following lettered paragraphs, it being understood that the following paragraphs should not be interpreted as limiting the scope of the claims as appended hereto or mandating that all such features must necessarily be included in such claims:

Other embodiments are set forth in the following claims.

What is claimed is:

1. A battery comprising an air cathode, an anode, an aqueous electrolyte, and a housing, wherein:
   the housing comprises one or more air access ports defining a total vent area;
   the battery exhibits a cell limiting current at 1.15V;
   a ratio of cell limiting current at 1.15 V to total vent area is greater than about 100 mA/mm$^2$; and
   the aqueous electrolyte comprises an amphoteric fluorosurfactant.

2. The battery of claim 1, wherein the ratio is greater than about 150 mA/mm$^2$.

3. The battery of claim 1, wherein the ratio is greater than 250 mA/mm$^2$.

4. The battery of claim 1, wherein the ratio is from about 100 mA/mm$^2$ to about 1000 mA/mm$^2$.

5. The battery of claim 1 having a nominal diameter of about 8 mm and a nominal height of about 5.4 mm.

6. The battery of claim 1 having a nominal diameter of about 8 mm and a nominal height of about 3.6 mm.

7. The battery of claim 1, wherein the battery has a nominal external volume from about 180 mm$^3$ to about 270 mm$^3$.

8. The battery of claim 1, wherein the nominal electrode interfacial area is about 35 mm$^2$.

9. The battery of claim 1, wherein the total vent area is from about 0.030 mm$^2$ to about 0.115 mm$^2$.

10. The battery of claim 1, wherein the cell limiting current at 1.15 V is about 4 mA to about 15 mA.

11. A battery comprising an air cathode, an anode, an aqueous electrolyte, and a housing, wherein:
    the housing comprises one or more air access ports defining a total vent area, and the total vent area is from about 0.030 mm$^2$ to about 0.115 mm$^2$;
    the battery exhibits a cell limiting current at 0.9V;
    the battery, when discharged at a current equal to half of the cell limiting current, maintains voltage of 1.17V or higher through 50% of its theoretical discharge capacity; and
    the aqueous electrolyte comprises an amphoteric fluorosurfactant.

12. The battery of claim 11 having a nominal diameter of about 8 mm and a nominal height of about 5.4 mm.

13. The battery of claim 11 having a nominal diameter of about 8 mm and a nominal height of about 3.6 mm.

14. The battery of claim 11, wherein the cell limiting current at 1.15 V is about 4 mA to about 15 mA.

15. A battery comprising an air cathode, an anode, an aqueous electrolyte, and a housing, wherein:
    the housing comprises one or more air access ports defining a total vent area, and the total vent area is from about 0.030 mm$^2$ to about 0.115 mm$^2$;
    the battery exhibits a cell limiting current at 0.9V;
    the battery, when discharged at a current equal to one-third of the limiting current, maintains voltage of 1.20V or higher through 50% of its theoretical discharge capacity; and
    the aqueous electrolyte comprises an amphoteric fluorosurfactant.

16. The battery of claim 15 having a nominal diameter of about 8 mm and a nominal height of about 5.4 mm.

17. The battery of claim 15 having a nominal diameter of about 8 mm and a nominal height of about 3.6 mm.

18. The battery of claim 15, wherein the cell limiting current at 1.15 V is about 4 mA to about 15 mA.

\* \* \* \* \*